(12) United States Patent
Ura et al.

(10) Patent No.: US 12,378,466 B2
(45) Date of Patent: Aug. 5, 2025

(54) ELECTROCHROMIC DISPLAY ELEMENT AND METHOD FOR PRODUCING ELECTROCHROMIC DISPLAY ELEMENT

(71) Applicants: Naoki Ura, Kanagawa (JP); Hiroyuki Takahashi, Kanagawa (JP)

(72) Inventors: Naoki Ura, Kanagawa (JP); Hiroyuki Takahashi, Kanagawa (JP)

(73) Assignee: Ricoh Company. Ltd., Tokyo (JP)

( * ) Notice: Subject to any disclaimer, the term of this patent is extended or adjusted under 35 U.S.C. 154(b) by 642 days.

(21) Appl. No.: 17/693,781

(22) Filed: Mar. 14, 2022

(65) Prior Publication Data

US 2022/0315830 A1    Oct. 6, 2022

(30) Foreign Application Priority Data

Mar. 23, 2021 (JP) .................................. 2021-048596

(51) Int. Cl.
*G02F 1/155* (2006.01)
*C09K 9/02* (2006.01)
(Continued)

(52) U.S. Cl.
CPC ............ *C09K 9/02* (2013.01); *G02F 1/15165* (2019.01); *G02F 1/1523* (2013.01); *G02F 1/155* (2013.01); *C09K 2211/1018* (2013.01)

(58) Field of Classification Search
CPC ........ G02F 1/15; G02F 1/155; G02F 1/15165; G02F 1/163; G02F 1/1514; G02F 1/1516; G02F 1/1533; G02F 1/153; G02F 1/157; G02F 1/1525; G02F 1/1523; G02F 1/1508; B32B 17/06; B32B 27/08; B32B 27/36; B32B 37/24; C09K 9/02; C09K 2211/1018
(Continued)

(56) References Cited

U.S. PATENT DOCUMENTS

2004/0252099 A1   12/2004  Walder et al.
2006/0204866 A1    9/2006  Hirano et al.
(Continued)

FOREIGN PATENT DOCUMENTS

JP      56-91222    7/1981
JP      3-107129    5/1991
(Continued)

OTHER PUBLICATIONS

Extended European Search Report dated Jul. 15, 2022, in European Application No. 22162486.9, 7 pages.

*Primary Examiner* — Jie Lei
(74) *Attorney, Agent, or Firm* — Grüneberg and Myers PLLC

(57) ABSTRACT

Provided is an electrochromic display element including a first substrate, a first electrode over the first substrate, a first electrochromic layer over the first electrode, an electrolyte layer over the first electrochromic layer, a second electrode over the electrolyte layer, and a second substrate over the second electrode. The first electrochromic layer contains tin oxide having an average primary particle diameter of less than 30 nm and an electrochromic compound containing a functional group bindable to the tin oxide. The amount by mole of the electrochromic compound per area of the first electrochromic layer is from $2.0 \times 10^{-8}$ mol/cm$^2$ through $2.0 \times 10^{-7}$ mol/cm$^2$.

7 Claims, 1 Drawing Sheet

(51) Int. Cl.
*G02F 1/1516* (2019.01)
*G02F 1/1523* (2019.01)

(58) Field of Classification Search
USPC ............... 359/265, 266, 270, 271, 273, 900
See application file for complete search history.

(56) References Cited

U.S. PATENT DOCUMENTS

| | | |
|---|---|---|
| 2011/0222139 A1 | 9/2011 | Naijo et al. |
| 2012/0139824 A1 | 6/2012 | Takahashi et al. |
| 2012/0139825 A1 | 6/2012 | Yashiro et al. |
| 2012/0154892 A1 | 6/2012 | Yashiro et al. |
| 2013/0250394 A1 | 9/2013 | Okada et al. |
| 2013/0258439 A1 | 10/2013 | Naijo et al. |
| 2013/0335802 A1 | 12/2013 | Kim et al. |
| 2014/0078569 A1 | 3/2014 | Takahashi et al. |
| 2014/0268284 A1 | 9/2014 | Naijo et al. |
| 2015/0198857 A1 | 7/2015 | Yashiro et al. |
| 2015/0274761 A1 | 10/2015 | Sagisaka et al. |
| 2015/0331295 A1 | 11/2015 | Takahashi et al. |
| 2015/0378233 A1 | 12/2015 | Fujimura et al. |
| 2016/0108072 A1 | 4/2016 | Inoue et al. |
| 2017/0010514 A1 | 1/2017 | Yashiro et al. |
| 2017/0131609 A1 | 5/2017 | Okada et al. |
| 2017/0168366 A1 | 6/2017 | Shinoda et al. |
| 2017/0226413 A1 | 8/2017 | Goto et al. |
| 2017/0235203 A1 | 8/2017 | Yamamoto et al. |
| 2017/0329198 A1 | 11/2017 | Matsuoka et al. |
| 2018/0314125 A1 | 11/2018 | Goto et al. |
| 2019/0227401 A1 | 7/2019 | Yutani et al. |
| 2019/0294015 A1 | 9/2019 | Ura et al. |
| 2019/0324338 A1 | 10/2019 | Takauji et al. |
| 2020/0103718 A1 | 4/2020 | Okada et al. |
| 2020/0299822 A1 | 9/2020 | Kim et al. |
| 2020/0301226 A1 | 9/2020 | Yashiro et al. |
| 2020/0409182 A1 | 12/2020 | Endoh et al. |
| 2021/0032531 A1 | 2/2021 | Kaneko et al. |
| 2022/0035216 A1 | 2/2022 | Ura et al. |

FOREIGN PATENT DOCUMENTS

| | | |
|---|---|---|
| JP | 2003248242 | 9/2003 |
| JP | 2004-205628 | 7/2004 |
| JP | 2007-171781 | 7/2007 |
| JP | 2008-026605 | 2/2008 |
| JP | 2008-26607 | 2/2008 |
| JP | 2008-116718 | 5/2008 |
| JP | 2008-181003 | 8/2008 |
| JP | 2017-003806 | 1/2017 |
| WO | WO1998/035267 A1 | 8/1998 |
| WO | WO2003/001288 A2 | 1/2003 |
| WO | WO2004/067672 A1 | 8/2004 |
| WO | WO2005/100504 A1 | 10/2005 |

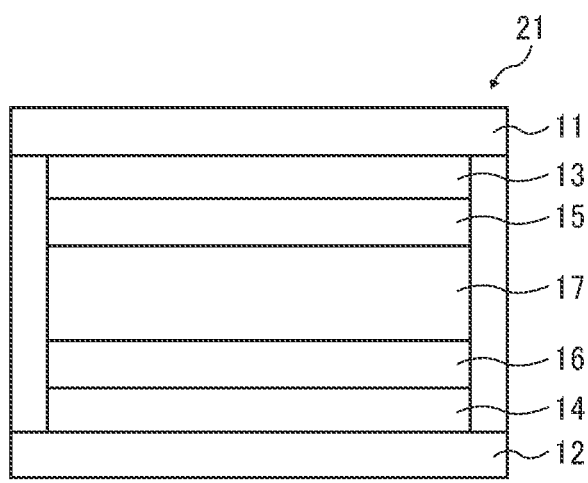

ELECTROCHROMIC DISPLAY ELEMENT AND METHOD FOR PRODUCING ELECTROCHROMIC DISPLAY ELEMENT

CROSS-REFERENCE TO RELATED APPLICATIONS

This patent application is based on and claims priority pursuant to 35 U.S.C. § 119(a) to Japanese Patent Application No. 2021-048596, filed on Mar. 23, 2021, in the Japan Patent Office, the entire disclosure of which is hereby incorporated by reference herein.

BACKGROUND

Technical Field

The present disclosure relates to an electrochromic display element and a method for producing the electrochromic display element.

Description of the Related Art

Electrochromism is a phenomenon that an oxidation reduction reaction occurs reversibly and color changes occur reversibly in response to application of a voltage.

Electrochromic display elements are a major contender as the next-generation display elements for reasons that they have a memory effect and can be driven at a low voltage. Application of electrochromic display elements to light control elements such as light control lenses, light control windows, and anti-glare mirrors is being studied.

In order for transmission-type light control elements such as light control lenses to have a high display quality, the elements indispensably need to have a high transparency. Among the components that affect the transparency of the electrochromic display elements are the supporting particles that support the electrochromic compound.

In existing electrochromic display elements, titanium oxide is suitably used as the supporting particles. The reasons are that titanium oxide has a hydroxyl group (OH group) that facilitates supporting the electrochromic compound by adsorption, and that titanium oxide has a sufficient conductivity that enables transfer of charges needed for color development and decolorization of the electrochromic compound while the titanium oxide exists between the electrode of the element and the electrochromic compound.

SUMMARY

According to one aspect of the present disclosure, an electrochromic display element includes a first substrate, a first electrode over the first substrate, a first electrochromic layer over the first electrode, an electrolyte layer over the first electrochromic layer, a second electrode over the electrolyte layer, and a second substrate over the second electrode. The first electrochromic layer contains tin oxide having an average primary particle diameter of less than 30 nm and an electrochromic compound containing a functional group bindable to the tin oxide. An amount by mole of the electrochromic compound per area of the first electrochromic layer is from $2.0 \times 10^{-8}$ mol/cm$^2$ through $2.0 \times 10^{-7}$ mol/cm$^2$.

According to one aspect of the present disclosure, a method for producing the above-described electrochromic display element include: washing the tin oxide to which the electrochromic compound is adsorbed, to remove any electrochromic compound that is left unadsorbed to the tin oxide.

BRIEF DESCRIPTION OF THE DRAWING

A more complete appreciation of the disclosure and many of the attendant advantages and features thereof can be readily obtained and understood from the following detailed description with reference to the accompanying drawing, wherein the drawing is a schematic diagram illustrating an electrochromic display element of the present disclosure.

The accompanying drawing is intended to depict embodiments of the present invention and should not be interpreted to limit the scope thereof. The accompanying drawing is not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure can provide an electrochromic display element that has an excellent transparency, is suppressed from cracking of a color developing layer thereof, and has a good appearance and a good operability.

(Electrochromic Display Element)

An electrochromic display element of the present disclosure includes a first substrate, a first electrode over the first substrate, a first electrochromic layer over the first electrode, an electrolyte layer over the first electrochromic layer, a second electrode over the electrolyte layer, and a second substrate over the second electrode, and preferably includes a second electrochromic layer, and further includes other members as needed.

The electrochromic display element of the present disclosure is based on the following problems of the related art found by the inventors of the present invention.

That is, the electrochromic display element described in JP-2017-003806-A is characterized in that the electrochromic display element contains tin oxide particles and an electrochromic compound supported by the tin oxide particles, and that the average primary particle diameter of the tin oxide particles is less than 30 nm. However, the inventors of the present invention have found that when an electrochromic display element using a resin substrate is processed to be bent, a crack occurs in the electrochromic layer, leading to problems that the obtained element has a reduced responsiveness in color development and decolorization and a reduced transparency.

As a result of earnest studies into the mole number (amount of adsorption) of the electrochromic compound per area of the first electrochromic layer, the inventors of the present invention have found that when the electrochromic display element is processed to be bent, no crack would occur in the electrochromic layer depending on the amount of adsorption of the electrochromic compound.

As a result of further studies, the inventors of the present invention have found it possible to obtain a high transparency during a decolorized state and a good responsiveness during a color developing state because of occurrence of no crack within a specific range of the amount of adsorption of the electrochromic compound.

<First Substrate and Second Substrate>

The first substrate and the second substrate (hereinafter, may be simply referred to as "substrates" when either of the substrates is not identified) are substrates that support a laminate structure including, for example, the first electrode, the second electrode, and the electrolyte layer.

The material of the substrates is not particularly limited and may be appropriately selected depending on the intended purpose. A translucent material is preferable.

Examples of the substrates include, but are not limited to, glass and resins. It is preferable that the first substrate or the second substrate, or both be a resin.

The resin is not particularly limited, and a known resin material may be appropriately selected depending on the intended purpose. Examples of the resin include, but are not limited to, polycarbonate resins, acrylic resins, polyethylene resins, polyvinyl chloride resins, polyester resins, epoxy resins, melamine resins, phenol resins, polyurethane resins, and polyimide resins.

Among these resins, polycarbonate resins are preferable in terms of transparency and toughness.

<First Electrode and Second Electrode>

The first electrode is an electrode formed on the first substrate.

The second electrode is an electrode formed on a first substrate's side surface of the second substrate facing the first substrate, and faces the first electrode.

Color development of the electrochromic compound is determined by the magnitude of the voltage dropping across the first electrode and the second electrode and the voltage application time. Under these factors, color gradation of the electrochromic layer changes.

The materials of the first electrode and the second electrode (hereinafter, may be simply referred to as "electrodes" when either of the electrodes is not identified) are not particularly limited and may be appropriately selected depending on the intended purpose so long as the materials are translucent conductive materials. Examples of the materials of the electrodes include, but are not limited to, inorganic materials such as tin-doped indium oxide (hereinafter, may also be referred to as "ITO"), fluorine-doped tin oxide (hereinafter, may also be referred to as "FTO"), antimony-doped tin oxide (hereinafter, may also be referred to as "ATO"), and zinc oxide. Among these materials, InSnO, GaZnO, SnO, $In_2O_3$, and ZnO are preferable.

Moreover, transparent carbon nanotube may be used, and electrodes formed of, for example, highly conductive non-transmissive materials such as Au, Ag, Pt, and Cu that are formed into a minute network shape to have transparency while having improved conductivity may also be used.

The average thickness of the first electrode and the second electrode is not particularly limited and may be appropriately selected depending on the intended purpose. It is preferable to adjust the average thickness of the first electrode and the second electrode in a manner that electrical resistance values needed for electrochromic oxidation reduction reactions can be obtained. When ITO is used, the average thickness of the first electrode and the second electrode is preferably 50 nm or greater 500 nm or less.

Examples of the method for producing the first electrode and the second electrode include, but are not limited to, a vacuum vapor deposition method, a sputtering method, and an ion plating method when the materials of the first electrode and the second electrode are inorganic compounds.

The method for applying the materials of the first electrode and the second electrode is not particularly limited and may be appropriately selected depending on the intended purpose so long as the method can form the electrodes by applying the materials. Examples of the method include, but are not limited to, a spin coating method, a casting method, a microgravure coating method, a gravure coating method, a bar coating method, a roll coating method, a wire bar coating method, a dip coating method, a slit coating method, a capillary coating method, a spray coating method, and a nozzle coating method, and various printing methods such as a gravure printing method, a screen printing method, a flexographic printing method, an offset printing method, a reverse printing method, and an inkjet printing method.

<First Electrochromic Layer>

The first electrochromic layer contains tin oxide and an electrochromic compound.

The first electrochromic layer is formed on the first electrode. Examples of the formation of the first electrochromic layer include, but are not limited to, the first electrochromic layer laminated on the first electrode, two or more layers of the first electrochromic layer laminated on the first electrode, and the first electrochromic layer laminated on a part of the first electrode. "On the first electrode" means "on a surface of the first electrode facing the second electrode".

—Tin Oxide—

The tin oxide is tin oxide (IV) represented by a chemical formula $SnO_2$.

A preferable state of the tin oxide is a particle state. The average primary particle diameter of the tin oxide is less than 30 nm, preferably 1 nm or greater but less than 30 nm, and more preferably 3 nm or greater but 8 nm or less.

When the average primary particle diameter of the tin oxide is less than 30 nm, the first electrochromic layer can become a transparent layer. That is, in a transmission-type display element, such a first electrochromic layer can develop a vivid color and can decolorize to a colorless, transparent state.

Transparency significantly depends on the refractive index and the average primary particle diameter of the tin oxide. A refractive index closer to 1 is advantageous for transparency. The refractive index of tin oxide is 2, whereas the refractive index of anatase-type titanium oxide is 2.52 and the refractive index of rutile-type titanium oxide is 2.71.

Moreover, when the average primary particle diameter of the tin oxide is 3 nm or greater but 8 nm or less, the tin oxide can have a large specific surface area. A plenty of an electrochromic compound can be adsorbed to tin oxide having a large specific surface area. With a plenty of an electrochromic compound that develops a color and decolorizes, an electrochromic display element excellent in a display contrast ratio between a color developed state and a decolorized state can be obtained.

—Electrochromic Compound—

The electrochromic compound is a cathodic electrochromic compound containing a functional group bindable to the tin oxide. A hydroxyl group of the tin oxide and the functional group bindable to the tin oxide can directly or indirectly bind with each other. Through this binding, the electrochromic compound chemically binds with the tin oxide, and is adsorbed to and supported by the tin oxide.

In response to a voltage dropping across the first electrode and the second electrode, the electrochromic compound undergoes an oxidation reduction reaction and develops a color or decolorizes.

The electrochromic compound is not particularly limited so long as the electrochromic compound contains a functional group bindable to the tin oxide, and a cathodic electrochromic compound known as a chromophore may be appropriately used. Examples of the electrochromic compound include, but are not limited to, anthraquinone-based compounds, viologen-based compounds, thioindigo-based compounds, phthalic acid ester-based compound, and dipyridine-based compounds. One of these electrochromic compounds may be used alone or two or more of these electrochromic compounds may be used in combination.

Among these electrochromic compounds, viologen-based compounds and dipyridine-based compounds that can develop a color suitably even when the voltage applied across the electrodes is low are preferable.

Examples of the viologen-based compounds include, but are not limited to, the compounds described in JP-3955641-B and the compounds described in JP-2007-171781-A.

Examples of the dipyridine-based compounds include, but are not limited to, compounds represented by General formula (1) below, the compounds described in JP-2007-171781-A, and the compounds described in JP-2008-116718-A.

[Functional Group Bindable to Tin Oxide]

The functional group bindable to the tin oxide is a functional group that can directly or indirectly bind with a hydroxyl group.

The functional group bindable to the tin oxide needs at least to be a functional group that can directly or indirectly bind with a hydroxyl group through hydrogen binding, adsorption, or a chemical reaction. The structure of the functional group bindable to the tin oxide is not particularly limited. Examples of the functional group bindable to the tin oxide include, but are not limited to, a phosphonic acid group, a phosphoric acid group, a carboxylic acid group, a sulfonyl group, a silyl group, and a silanol group.

Among these groups, a phosphonic acid group, a phosphoric acid group, and a carboxylic acid group are preferable and a phosphonic acid group is more preferable in terms of easy synthesizability, adsorbability to the supporting particles, and stability of a compound.

When the electrochromic compound contains, for example, a phosphonic acid group, a phosphoric acid group, a carboxylic acid group, or a sulfonyl group as the functional group bindable to the tin oxide, the electrochromic compound easily adsorbs to a conductive or semi-conductive nanostructure formed of the tin oxide. When the electrochromic compound contains, for example, a silyl group or a silanol group, the electrochromic compound adheres to the nanostructure through siloxane binding and firmly binds with the nanostructure. Hence, a stable electrochromic layer can be obtained. The siloxane binding means chemical binding through a silicon atom and an oxygen atom.

Examples of the phosphonic acid group include, but are not limited to, a methyl phosphonic acid group, an ethyl phosphonic acid group, a propyl phosphonic acid group, a hexyl phosphonic acid group, an octyl phosphonic acid group, a decyl phosphonic acid group, a dodecyl phosphonic acid group, an octadecyl phosphonic acid group, a benzyl phosphonic acid group, a phenyl ethyl phosphonic acid group, a phenyl propyl phosphonic acid group, and a biphenyl phosphonic acid group.

Examples of the phosphoric acid group include, but are not limited to, a methyl phosphoric acid group, an ethyl phosphoric acid group, a propyl phosphoric acid group, a hexyl phosphoric acid group, an octyl phosphoric acid group, a decyl phosphoric acid group, a dodecyl phosphoric acid group, an octadecyl phosphoric acid group, a benzyl phosphoric acid group, a phenyl ethyl phosphoric acid group, a phenyl propyl phosphoric acid group, and a biphenyl phosphoric acid group.

Examples of the carboxylic acid group include, but are not limited to, a methyl carboxylic acid group, an ethyl carboxylic acid group, a propyl carboxylic acid group, a hexyl carboxylic acid group, an octyl carboxylic acid group, a decyl carboxylic acid group, a dodecyl carboxylic acid group, an octadecyl carboxylic acid group, a benzyl carboxylic acid group, a phenyl ethyl carboxylic acid group, a phenyl propyl carboxylic acid group, a biphenyl carboxylic acid group, a 4-propyl phenyl carboxylic acid group, and a 4-propyl biphenyl carboxylic acid group.

Examples of the sulfonyl group include, but are not limited to, a methyl sulfonyl group, an ethyl sulfonyl group, a propyl sulfonyl group, a hexyl sulfonyl group, an octyl sulfonyl group, a decyl sulfonyl group, a dodecyl sulfonyl group, an octadecyl sulfonyl group, a benzyl sulfonyl group, a phenyl ethyl sulfonyl group, a phenyl propyl sulfonyl group, and a biphenyl sulfonyl group.

Examples of the silyl group include, but are not limited to, a methyl silyl group, an ethyl silyl group, a propyl silyl group, a hexyl silyl group, an octyl silyl group, a decyl silyl group, a dodecyl silyl group, an octadecyl silyl group, a benzyl silyl group, a phenyl ethyl silyl group, a phenyl propyl silyl group, and a biphenyl silyl group.

Examples of the silyl group include, but are not limited to, an alkoxy silyl group below.

In the formula above, $R^{100}$ represents an alkyl group containing from 1 through 4 carbon atoms. $OR^{101}$ represents an alkoxy group containing from 1 through 4 carbon atoms, and "n" represents an integer of from 0 through 2. When there are two or more $R^{100}$, the two or more $R^{100}$ may be the same or different. When there are two or more $OR^{101}$, the two or more $OR^{101}$ may be the same or different.

Examples of the silanol group include, but are not limited to, a methyl silanol group, an ethyl silanol group, a propyl silanol group, a hexyl silanol group, an octyl silanol group, a decyl silanol group, a dodecyl silanol group, an octadecyl silanol group, a benzyl silanol group, a phenyl ethyl silanol group, a phenyl propyl silanol group, and a biphenyl silanol group.

As the electrochromic compound, a compound represented by General formula (1) below is preferable.

General formula (1)

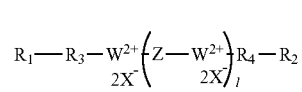

In General formula (1) above, $R_1$ and $R_2$ each independently represent a hydrogen atom, an aryl group that contains from 6 through 14 carbon atoms and may contain a substituent, a heteroaryl group that contains from 3 through 14 carbon atoms and may contain a substituent, a branched alkyl group that contains from 3 through 10 carbon atoms, an alkenyl group that contains from 2 through 10 carbon atoms and may contain a substituent, a cycloalkyl group that contains from 6 through 10 carbon atoms and may contain a substituent, or the functional group bindable to the tin oxide, $R_1$ or $R_2$, or both are the functional group bindable to the tin oxide, $R_3$ and $R_4$ each independently represent an alkylene group that contains from 1 through 10 carbon atoms and may contain a substituent or an arylene group that contains from 6 through 12 carbon atoms and may contain a substituent, $W^{2+}$ represents a dication represented by General formula (2) below, Z represents an alkylene group that contains from 1 through 12 carbon atoms and may contain a substituent, a cycloalkylene group that contains from 3 through 7 carbon atoms and may contain a substituent, or a divalent group represented by General formula (3) below, "l" represents 0 or 1, and $X^-$ represents a monovalent anion.

General formula (2)

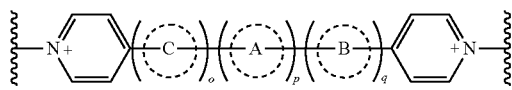

In General formula (2), "o", "p", and "q" each independently represent 0 or 1, A, B, and C each independently represent an arylene group that contains from 2 through 20 carbon atoms and may contain a substituent, or a heterocyclic group that contains from 2 through 20 carbon atoms and may contain a substituent.

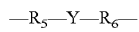 General formula (3)

In General formula (3). $R_5$ and $R_6$ each independently represent a single bond, alkylene, or cycloalkylene, Y represents arylene, cycloalkylene, heteroarylene, arylene-arylene, or arylene-CR'R"-arylene, and R' and R" form a carbocyclic group together with carbon with which R' and R" bind.

The optional expression "may contain a substituent" described above means that each group mentioned may contain one or a plurality of substituents at a substitutable site. Examples of the substituent include, but are not limited to, halogen, alkyl, alkoxy, alkylthio, hydroxyalkyl, acyloxy, cycloalkyl, aryl, aryloxy, and a heterocyclic group.

In General formula (1) above, $W^{2+}$ expresses an electrochromic function. When the $W^{2+}$ site undergoes oxidation-reduction, color changes occur. $R_1$, $R_2$, $R_3$, $R_4$, and Z neither contribute to the electrochromic function, nor inhibit the electrochromic function of $W^{2+}$.

$R_1$ or $R_2$, or both are the functional group bindable to the tin oxide. This facilitates adhesion to the conductive or semi-conductive nanostructure.

In a more preferred embodiment, $R_1$ and $R_2$ are both the functional groups bindable to the tin oxide. This makes binding more firm, reduces the possibility of desorption in the device, and improves reliability.

In another preferred embodiment, either $R_1$ or $R_2$ is the functional group bindable to the tin oxide. This enables a large part of the electrochromic compound to adhere to the conductive or semi-conductive nanostructure, and improves the color developing density.

In General formula (1) above, Z is preferably selected from C1-C12 alkylene, C3-C7 cycloalkylene, C3-C14 arylene, C5-C10 heteroarylene, (C1-C4 alkylene)-(C3-C14 arylene), (C1-C4 alkylene)-(C3-C14 heteroarylene), (C1-C4 alkylene)-(C3-C14 arylene)-(C1-C4 alkylene), (C1-C4 alkylene)-(C3-C14 heteroarylene)-(C1-C4 alkylene), (C3-C14 arylene)-(C3-C14 arylene). (C1-C4 alkylene)-(C3-C14 arylene)-(C3-C14 arylene)-(C1-C4 alkylene), and (C3-C14 arylene)-(CR'R")—(C3-C14 arylene). R' and R" form a C3-C20 carbocyclic group together with carbon with which R' and R" bind. Arylene and a cycloalkylene group may be substituted with one or a plurality of substituents selected from halogen, C1-C4 alkyl. C1-C4 alkoxy, and C3-C7 cycloalkyl. An alkylene group may be substituted with one or a plurality of substituents selected from halogen, C3-C14 alkyl, C1-C12 alkoxy, C2-C12 acyloxy, C1-C12 hydroxyalkyl, C3-C12 cycloalkyl, phenyl, phenyloxy, and substituted phenyl.

Specifically, substituted alkylene contains —$CH_2(CR_aR_b)CH_2$—, where $R_a$ and $R_b$ may be independently selected from H, C3-C14 alkyl, C3-C12 cycloalkyl, (cycloalkyl)methyl, aryl, substituted aryl, arylalkyl (e.g., benzyl or phenyl (C2-C7 alkyl)), phenyloxyethyl, substituted arylalkyl, C1-C12 alkoxy, C2-C12 acyloxy, C1-C12 hydroxyalkyl, and C1-C12 alkoxymethyl.

Z is more preferably selected from C1-C12 alkylene, aryl-substituted C1-C12 alkylene, phenylene, naphthylene, (C1-C4 alkylene)-phenylene-(C1-C4 alkylene), (C1-C4 alkylene)-naphthylene-(C1-C4 alkylene) (e.g., naphthylene bis(methylene)), quinoxaline-2,3-diyl, (C1-C4 alkylene)-quinoxaline-2,3-diyl-(C1-C4 alkylene) (e.g., quinoxaline-2,3-diyl bis(methylene)), phenylene-phenylene, (C1-C4 alkylene)-phenylene-phenylene-(C1-C4 alkylene), and phenylene-fluorenine-phenylene.

Examples of Z include, but are not limited to, —$CH_2$—, —$(CH_2)_2$—, —$(CH_2)_3$—, —$(CH_2)_4$—, —$(CH_2)_5$—, —$CH_2$—CH(CH)—$CH_2$—, —$CH_2$—CH($CH_2$ phenyl)-$CH_2$—, —$(CH_2)_2$—CH($CH_3$)—$CH_2$—, —$(CH_2)_3$—CH($CH_3$)—$CH_2$—, —$(CH_2)_2$—CH($CH_3$)—$(CH_2)_2$—, and divalent groups presented below.

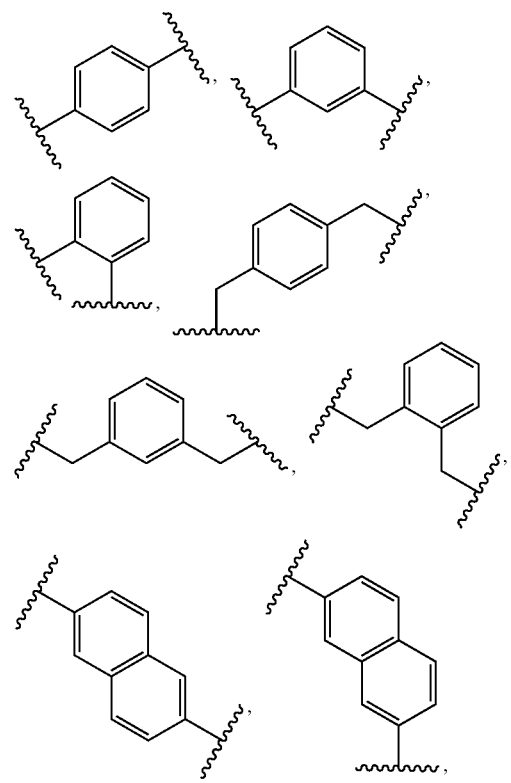

-continued

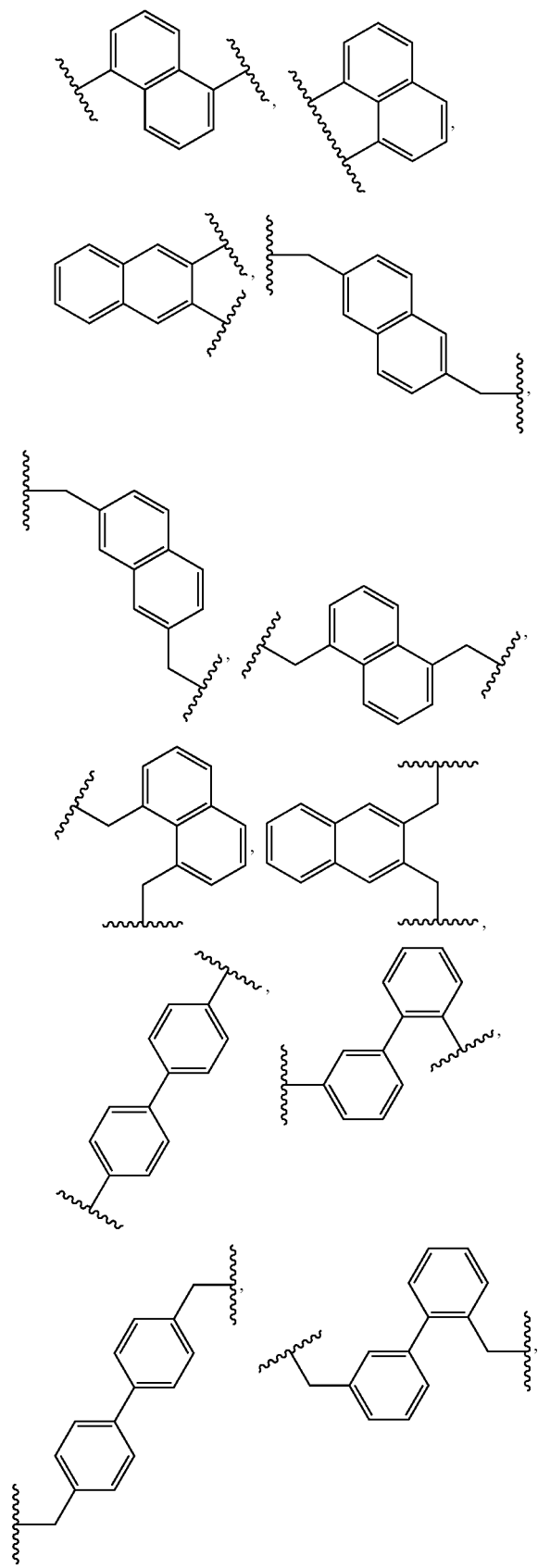

-continued

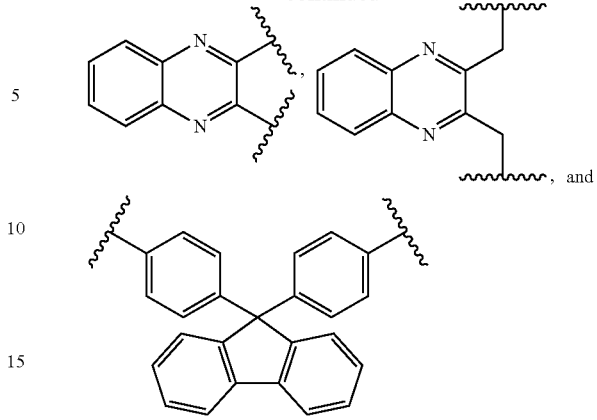

In General formula (1) above, the monovalent anion represented by $X^-$ is not particularly limited and may be appropriately selected considering, for example, ease of synthesis. Examples of the monovalent anion include, but are not limited to, $Cl^-$, $Br^-$, $ClO_4^-$, $PF_6^-$, $(FSO_2)_2N^-$, $(CF_3SO_2)_2N^-$, $(CN)_4B^-$, $BF_4^-$, $CF_3BF_3^-$, $PF_6^-$, $ClO_4^-$, $(C_2F_5SO_2)_2N^-$, $(C_4F_9SO_2)_2N^-$, $CF_3SO_3$, $C_2F_5SO_3$, $C_4F_9SO_3$, $(C_2F_5)_3PF_3^-$ and $(CF_3SO_2)_3C^-$.

It is more preferable that the oxidation potential of $X^-$ in General formula (1) be higher than the reduction potential of the dication in General formula (1) by 3.1 V or more. In other words, it is preferable that $X^-$ be a monovalent anion having an oxidation potential higher than the reduction potential of the dication in General formula (1) by 3.1 V or more. When the oxidation potential of $X^-$ is higher than the reduction potential of the dication in General formula (1) by 3.1 V or more, no absorption band occurs in the visible range even when $W^{2+}$ and the anion form a charge-transfer complex, and a device having a high transparency is obtained.

Examples of $X^-$ or anion, of which oxidation potential has a potential difference of 3.1 V or more from the reduction potential of the dication include, but are not limited to, $(FSO_2)_2N^-$, $(CF_3SO_2)_2N^-$, $(CN)_4B^-$, $BF_4^-$, $CF_3BF_3^-$, $PF_6^-$, $ClO_4^-$, $(C_2F_5SO_2)_2N^-$, $(C_4F_9SO_2)_2N^-$, $CF_3SO_3$, $C_2F_5SO_3$, $C_4F_9SO_3$, $(C_2F_5)_3PF_3^-$ and $(CF_3SO_2)_3C^-$. One of these anions may be used alone or a plurality of kinds of anions may be used in combination.

In a more preferred embodiment, $X^-$ is one or a plurality of kinds selected from $(FSO_2)_2N^-$, $(CF_3SO_2)_2N^-$, $(CN)_4B^-$, $BF_4^-$, $PF_6^-$, and $ClO_4^-$. These anions are large enough not to easily form a CT complex with the dication, are stable, and are not too large to obtain a sufficient response speed. Therefore, using these anions, it is possible to obtain a device that is excellent not only in transparency but in responsiveness.

In the most preferred embodiment, $X^-$ is $(CF_3SO_2)_2N^-$ (hereinafter, may be referred to as "TFSI$^-$"). Using $(CF_3SO_2)_2N^-$, it is possible to obtain a device that can realize a higher color developing density. Although the mechanism for this has not been elucidated, it is inferred that the distance between the dication molecules and the packing structure of the dication molecules when the electrochromic compound adheres to the nanostructure, and adhesion conditions such as the surface condition of the conductive or semi-conductive nanostructure during the adhesion process are involved. It is estimated that the surface condition of the conductive or semi-conductive nanostructure during the adhesion process changes depending on the wettability and pH of an electrochromic compound solution when applied on the nanostructure.

Examples of specific compounds that can be raised as examples of the electrochromic compound include, but are not limited to, an example compound 1-1 to an example compound 1-34 presented below. The electrochromic compound is not limited to these compounds.
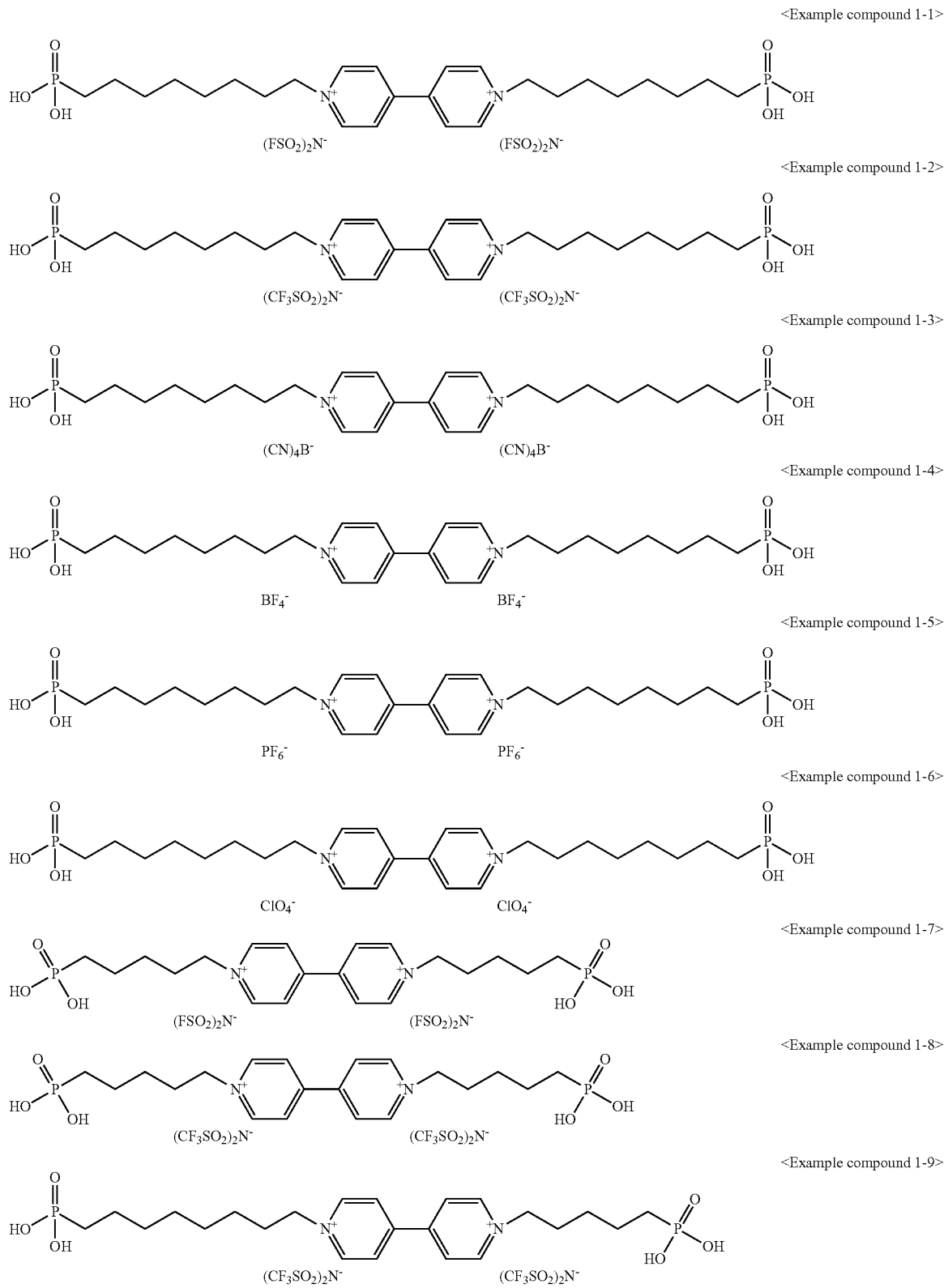

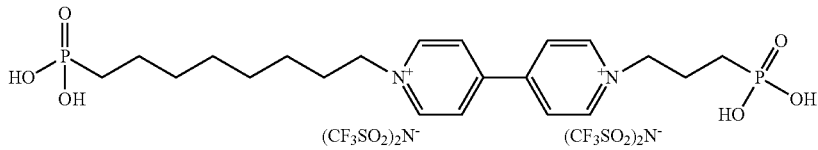
<Example compound 1-10>
<Example compound 1-11>
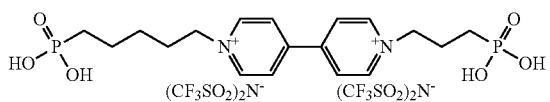
<Example compound 1-12>
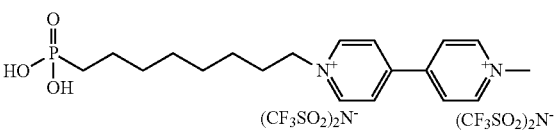
<Example compound 1-13>
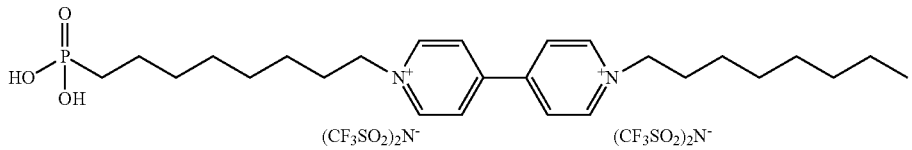
<Example compound 1-14>
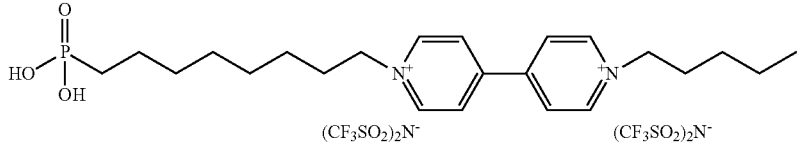
<Example compound 1-15>
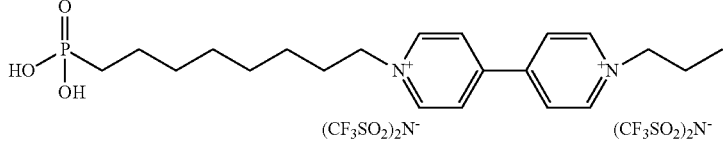
<Example compound 1-16>
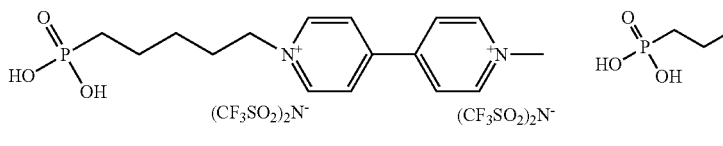
<Example compound 1-17>
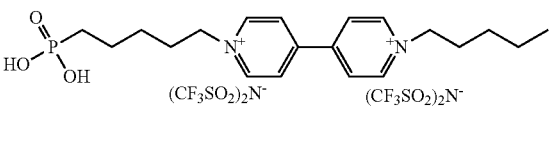
<Example compound 1-18>
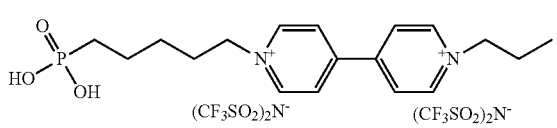
<Example compound 1-19>
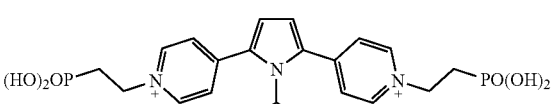
<Example compound 20>
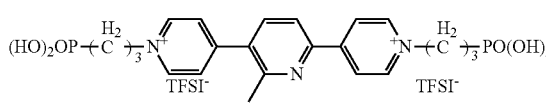
<Example compound 21>
<Example compound 22>
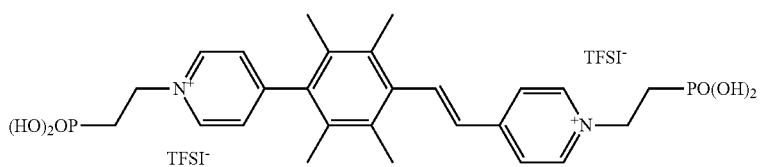

-continued
<Example compound 23>
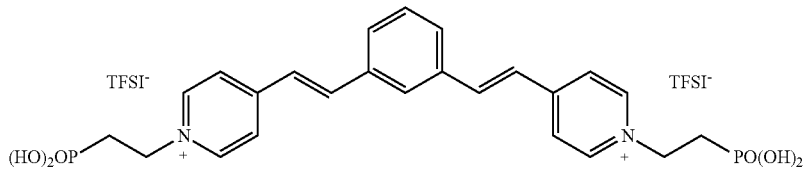
<Example compound 24>
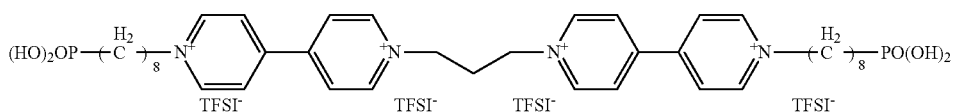
<Example compound 25>
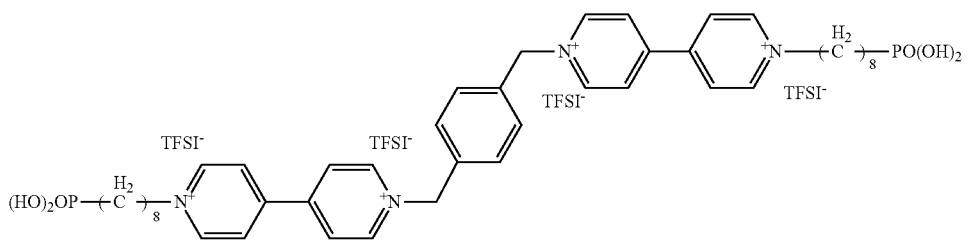
<Example compound 26>
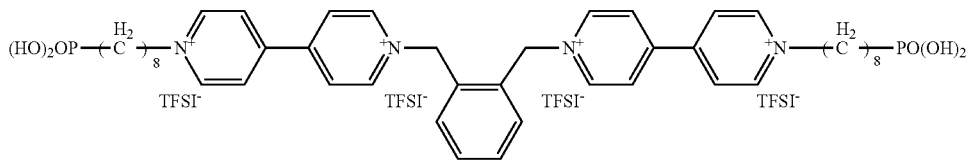
<Example compound 27>
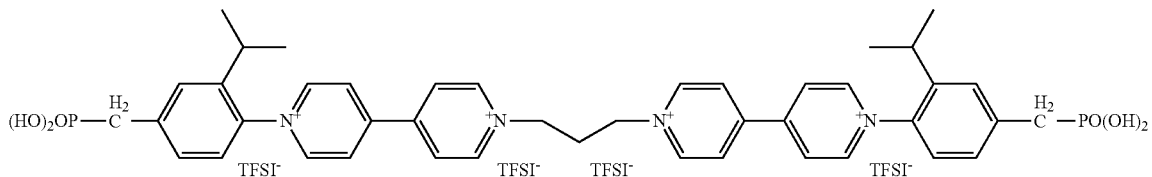
<Example compound 28>
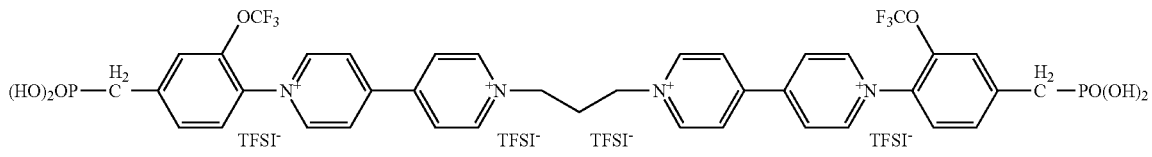
<Example compound 29>
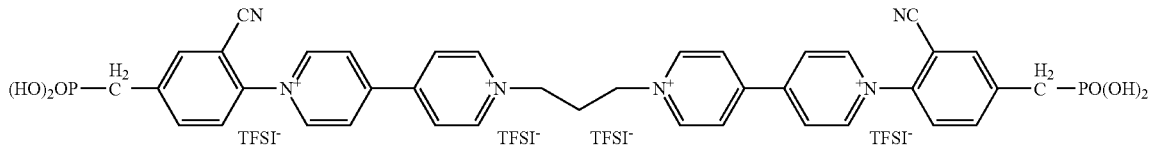
<Example compound 1-30>
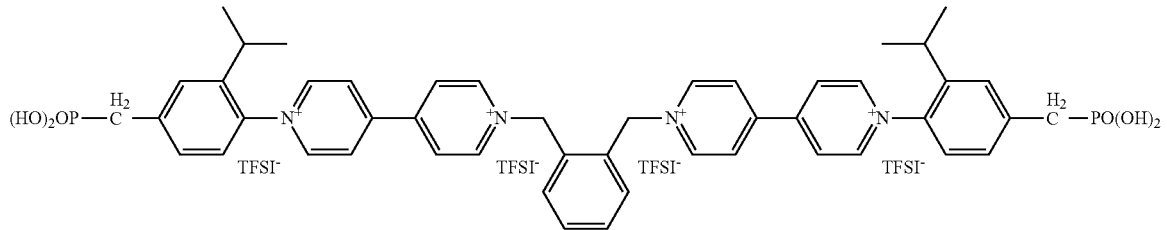

-continued

<Example compound 1-31>

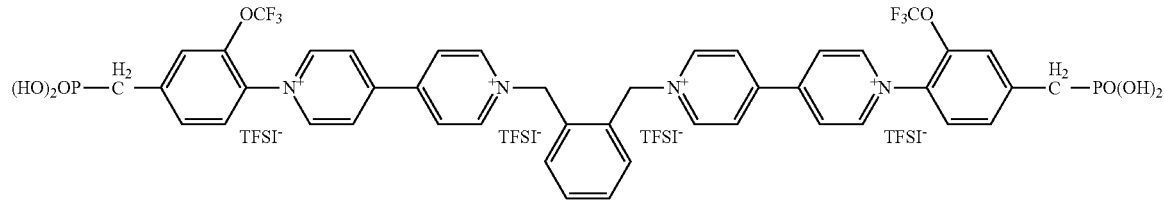

<Example compound 1-32>

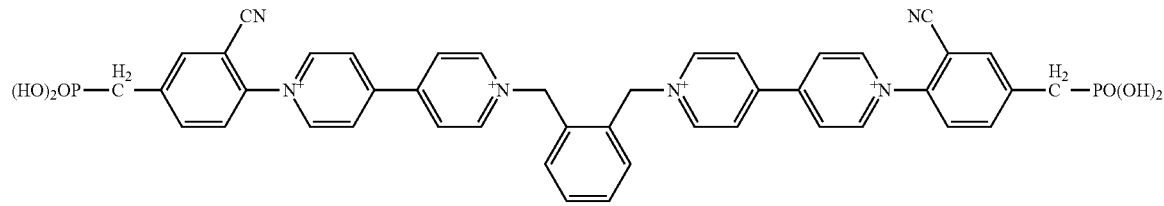

<Example compound 1-33>

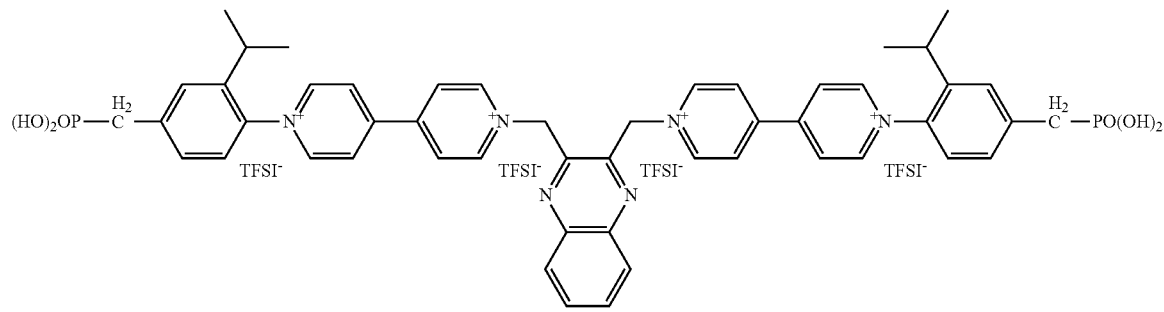

<Example compound 1-34>

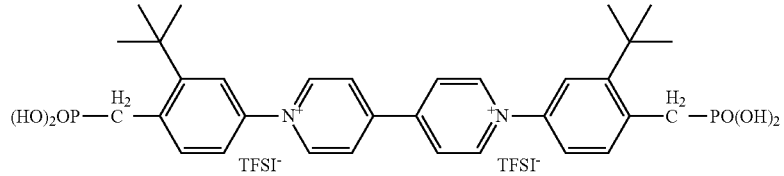

As the electrochromic compound, a compound represented by General formula (1) above is preferable. Using an electrochromic compound represented by General formula (1) above, it is possible to produce an electrochromic display element that has a high transparency by suppression of transmittance reduction due to scattering light at a crack and transmittance reduction due to light absorption by the electrochromic compound.

The amount by mole of the electrochromic compound per area of the first electrochromic layer is from $2.0 \times 10^{-8}$ mol/cm$^2$ through $2.0 \times 10^{-7}$ mol/cm$^2$, preferably from $3.0 \times 10^{-8}$ mol/cm$^2$ through $1.5 \times 10^{-7}$ mol/cm$^2$, and more preferably from $6.0 \times 10^{-8}$ mol/cm$^2$ through $1.2 \times 10^{-7}$ mol/cm$^2$.

The amount by mole of the electrochromic compound per area of the first electrochromic layer represents the amount of the electrochromic compound adsorbed to the first electrochromic layer. The area of the first electrochromic layer means the area of the portion on which the first electrochromic layer is formed.

When the amount by mole of the electrochromic compound is less than $2.0 \times 10^{-8}$ mol/cm$^2$, the amount of the electrochromic compound adsorbed is low, and a sufficiently high color developing density may not be obtained. Tin oxide also has an electrochemical reaction capacity. Hence, when the amount by mole of the electrochromic compound is not greater than or equal to $2.0 \times 10^{-8}$ mol/cm$^2$, the first electrochromic compound does not have enough reaction capacity with respect to the second electrochromic layer, and may not be able to obtain a sufficiently high color developing density. When the amount by mole of the electrochromic compound is greater than $2.0 \times 10^{-7}$ mol/cm$^2$, a problem may occur that the electrochromic layer is cracked when the substrate is bent, and the display quality is spoiled.

Examples of the method for measuring the mole number (amount of adsorption) of the electrochromic compound include, but are not limited to, measurement of ultraviolet visible absorption spectra before and after adsorption, electrochemical measurement by a three-electrode method, and electrochemical measurement after the element is produced.

As the electrochemical measurement, for example, a cyclic voltammetry method, a chronoamperometry method, and a chronopotentiometry method may be used.

The average thickness of the first electrochromic layer is not particularly limited, may be appropriately selected depending on the intended purpose, and is preferably 1.0 micrometer or greater but 4.0 micrometers or less, more preferably 1.5 micrometers or greater but 3.5 micrometers or less, and yet more preferably 2.0 micrometers or greater but 3.0 micrometers or less.

When the average thickness of the first electrochromic layer is 1.0 micrometer or greater, the amount of the electrochromic compound adsorbed is sufficient, and a sufficiently high color developing density can be obtained. Tin oxide also has an electrochemical reaction capacity. Hence, when the average thickness of the first electrochromic layer is 1.0 micrometer or greater, the first electrochromic layer has enough reaction capacity with respect to the second electrochromic layer, and can obtain a sufficiently high color developing density. When the average thickness of the first electrochromic layer is 4.0 micrometers or less, it is possible to prevent a problem that the electrochromic layer is cracked when the substrate is bent, and the display quality is spoiled.

It is possible to measure the average thickness of the first electrochromic layer by calculating the average of measurements obtained at arbitrary ten or more points, by employing a measuring method using a profilometer, or when measuring the average thickness after the element is produced, by employing a measuring method using a scanning transmission electron microscopic (SEM) image of a cross-section.

<Electrolyte Layer>

The electrolyte layer is between the first electrode and the second electrode.

The electrolyte layer contains an electrolyte and an oxidizable substance.

Examples of the electrolyte include, but are not limited to, inorganic ion salts such as alkali metal salts and alkali earth metal salts, and quaternary ammonium salts and acidic and alkaline supporting electrolytes. Specific examples of the electrolyte include, but are not limited to, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$. One of these electrolytes may be used alone or two or more of these electrolytes may be used in combination.

An ionic liquid may also be used as the material of the electrolyte. Among ionic liquids, organic ionic liquids are preferable because organic ionic liquids have a molecular structure that is liquid in a wide temperature range including room temperature.

Examples of the cationic component of the molecular structure of the organic ionic liquids include, but are not limited to, imidazole derivatives such as N,N-dimethyl imidazole salts, N,N-methyl ethyl imidazole salts, and N,N-methyl propyl imidazole salts; pyridinium derivatives such as N,N-dimethyl pyridinium salts, and N,N-methyl propyl pyridinium salts; and aliphatic quaternary ammonium salts such as trimethyl propyl ammonium salts, trimethyl hexyl ammonium salts, and triethyl hexyl ammonium salts. As the anionic component of the molecular structure of the organic ionic liquids, it is preferable to use fluorine-containing compounds considering stability in the air. Examples of the anionic component of the molecular structure of the organic ionic liquids include, but are not limited to, $BF_4^-$, $CF_3SO_3^-$, $PF_4^-$, and $(CF_3SO_2)_2N^-$. One of these components may be used alone or two or more of these components may be used in combination.

As the material of the electrolyte, an ionic liquid formed of an arbitrary combination between the cationic components and the anionic components is preferable.

The ionic liquid may be directly dissolved in any selected from photopolymerizable monomers, oligomers, and liquid crystal materials. When solubility is poor, the ionic liquid may be dissolved in a small amount of a solvent, and the obtained solution may be used for being mixed with any selected from photopolymerizable monomers, oligomers, and liquid crystal materials.

Examples of the solvent include, but are not limited to, propylene carbonate, acetonitrile, γ-butyrolactone, ethylene carbonate, sulfolane, dioxolane, tetrahydrofuran, 2-methyl tetrahydrofuran, dimethyl sulfoxide, 1,2-dimethoxyethane, 1,2-ethoxymethoxyethane, polyethylene glycol, and alcohols. One of these solvents may be used alone or two or more of these solvents may be used in combination.

The electrolyte needs not be a low-viscosity liquid, but may have various forms such as a gel form, a form cross-linked by a polymer, and a form dispersed in a liquid crystal. It is advantageous to form the electrolyte in a gel form and a solid form in terms of improvement of the element strength and improvement of reliability.

Because a high ionic conductivity and a solid strength can be obtained, it is preferable to solidify the electrolyte by supporting the electrolyte and the solvent in a polymer.

As the polymer, a photocurable resin is preferable because the element can be produced at a lower temperature in a shorter time than when the element is produced by thermal polymerization or a thin film formation method by evaporation of a solvent.

The average thickness of the electrolyte layer is not particularly limited, may be appropriately selected depending on the intended purpose, and is preferably 100 nm or greater but 100 micrometers or less.

<Second Electrochromic Layer>

It is preferable that the electrochromic display element include a second electrochromic layer on a surface of the second electrode facing the first electrode.

The second electrochromic layer contains an anodic electrochromic compound.

Examples of the formation of the second electrochromic layer include, but are not limited to, the second electrochromic layer laminated on the second electrode, two or more layers of the second electrochromic layer laminated on the second electrode, and the second electrochromic layer laminated on a part of the second electrode.

—Anodic Electrochromic Compound—

The anodic electrochromic compound is a compound that changes light absorption within the target light wavelength range of the electrochromic element from the initial state through an electrochemical oxidation reaction. Compared with an electrochromic element containing only the cathodic electrochromic compound, an element further containing the anodic electrochromic compound is expected to be able to obtain a denser color development, save power consumption, and improve durability through repeating color development and decolorization.

The anodic electrochromic compound is not particularly limited so long as the anodic electrochromic compound can be supported as a layer on the second electrode. Inorganic compounds and organic compounds can be used as the anodic electrochromic compound.

Examples of the inorganic compounds include, but are not limited to, iridium oxide, nickel oxide, rhodium oxide, and chromium oxide. Examples of the organic compounds include, but are not limited to, amines containing an aromatic ring (e.g., phenazine derivatives and triarylamine derivatives), thiophene derivatives, pyrrole derivatives, thiazine derivatives, triallylmethane derivatives, bisphenylmethane derivatives, xanthene derivatives, fluoran derivatives, and spiropyran derivatives.

As the anodic electrochromic compound, a compound having a triarylamine structure is preferable in terms of, for example, a high driving durability, light resistance, color selectivity, and contrast. A compound having a triarylamine structure represented by General formula (4) below is more preferable.

$$A_n\text{-}B_m \quad \text{General formula (4)}$$

In General formula (4), "n" represents 1 or 2. When "n" is 1, "m" is 0 or 1. When "n" is 2, "m" is 0. "A" is represented by General formula (5) below and binds with "B" at any position selected from $R_1$ through $R_{15}$. "B" is represented by General formula (6) below and binds with "A" at any position selected from $R_{16}$ through $R_{21}$.

General formula (5)

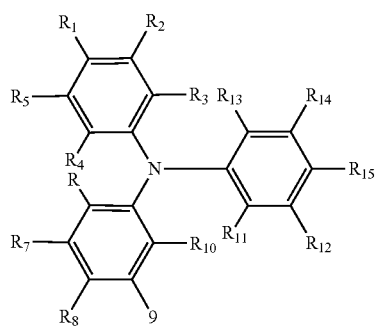

General formula (6)

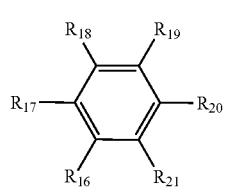

In General formula (5) and General formula (6), at least one selected from $R_1$ through $R_2$, is a functional group bindable with a hydroxyl group, or a polymerizable functional group, and the rest of $R_1$ through $R_{21}$ are each independently a monovalent organic group that may contain a substituent.

The functional group bindable with a hydroxyl group needs at least be a functional group directly or indirectly bindable with a hydroxyl group through hydrogen binding, adsorption, or a chemical reaction, and the structure of the functional group bindable with a hydroxyl group is not limited. For example, a phosphonic acid group, a phosphoric acid group, a silyl group (or a silanol group), and a carboxyl group are preferable.

When at least one selected from $R_1$ through $R_{21}$ is a functional group bindable with a hydroxyl group, or a polymerizable group, the anodic electrochromic compound is chemically bound with the anodic electrochromic compound mutually, or with the conductive material of the second electrode. This makes it possible for the anodic electrochromic compound to be supported by the second electrode.

The polymerizable functional group is not particularly limited and may be appropriately selected depending on the intended purpose so long as the polymerizable functional group is a polymerizable group containing a carbon-carbon double bond. Examples of the polymerizable functional group include, but are not limited to, a vinyl group, a styryl group, a 2-methyl-1,3-butadienyl group, a vinyl carbonyl group, an acryloyloxy group, an acryloylamide group, and a vinyl thioether group.

The monovalent organic group is not particularly limited and may be appropriately selected depending on the intended purpose. Examples of the monovalent organic group include, but are not limited to, a hydrogen atom, a halogen atom, a hydroxyl group, a nitro group, a cyano group, a carboxyl group, an alkoxy carbonyl group, an aryloxy carbonyl group, an alkyl carbonyl group, an aryl carbonyl group, an amide group, a monoalkyl amino carbonyl group, a dialkyl amino carbonyl group, a monoaryl amino carbonyl group, a diaryl amino carbonyl group, a sulfonic acid group, an alkoxy sulfonyl group, an aryloxy sulfonyl group, an alkyl sulfonyl group, an aryl sulfonyl group, a sulfonamide group, a monoalkyl amino sulfonyl group, a dialkyl amino sulfonyl group, a monoaryl amino sulfonyl group, a diaryl amino sulfonyl group, an amino group, a monoalkyl amino group, a dialkyl amino group, an alkyl group, an alkenyl group, an alkynyl group, an aryl group, an alkoxy group, an aryloxy group, an alkylthio group, an arylthio group, and a heterocyclic group.

Among these monovalent organic groups, an alkyl group, an alkoxy group, a hydrogen atom, an aryl group, an aryloxy group, a halogen atom, an alkenyl group, and an alkynyl group are preferable for a stable operation.

Examples of the halogen atom include, but are not limited to, a fluorine atom, a chlorine atom, a bromine atom, and an iodine atom.

Examples of the alkyl group include, but are not limited to, a methyl group, an ethyl group, a propyl group, and a butyl group.

Examples of the aryl group include, but are not limited to, a phenyl group and a naphthyl group.

Examples of the aralkyl group include, but are not limited to, a benzyl group, a phenethyl group, and a naphthyl methyl group.

Examples of the alkoxy group include, but are not limited to, a methoxy group, an ethoxy group, and a propoxy group.

Examples of the aryloxy group include, but are not limited to, a phenoxy group, a 1-naphthyloxy group, a 2-naphthyloxy group, a 4-methoxy phenoxy group, and a 4-methyl phenoxy group.

Examples of the heterocyclic group include, but are not limited to, carbazole, dibenzofuran, dibenzothiophene, oxadiazole, and thiadiazole.

The monovalent organic group may contain a substituent. Examples of the substituent include, but are not limited to, a halogen atom, alkyl groups such as a nitro group, a cyano group, a methyl group, and an ethyl group, alkoxy groups such as a methoxy group and an ethoxy group, aryloxy groups such as a phenoxy group, aryl groups such as a phenyl group and a naphthyl group, and aralkyl groups such as a benzyl group and a phenethyl group.

Examples of the compound represented by General formula (4) above include, but are not limited to, an example compound 2-1 to an example compound 2-10 presented below.

(Example compound 2-1)
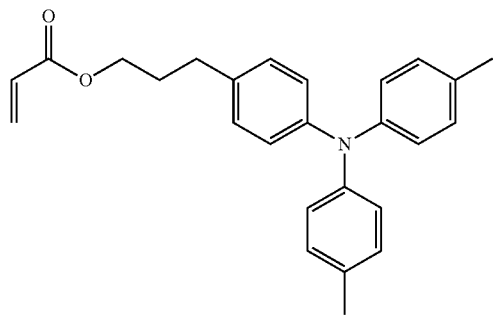
(Example compound 2-2)
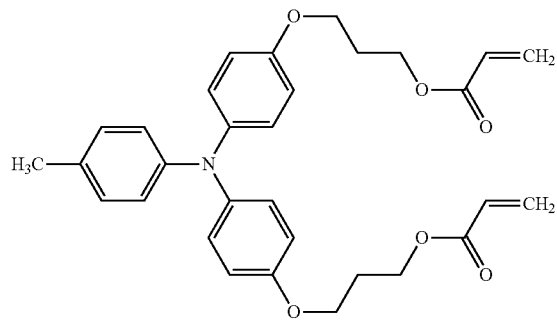
(Example compound 2-3)
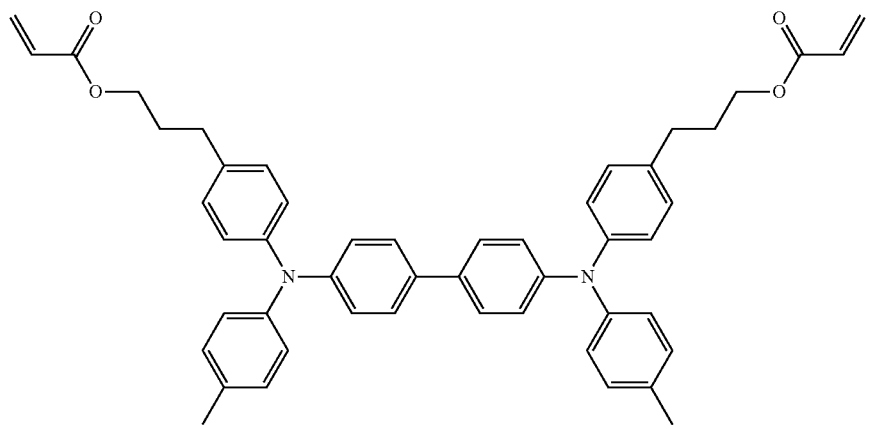
(Example compound 2-4)
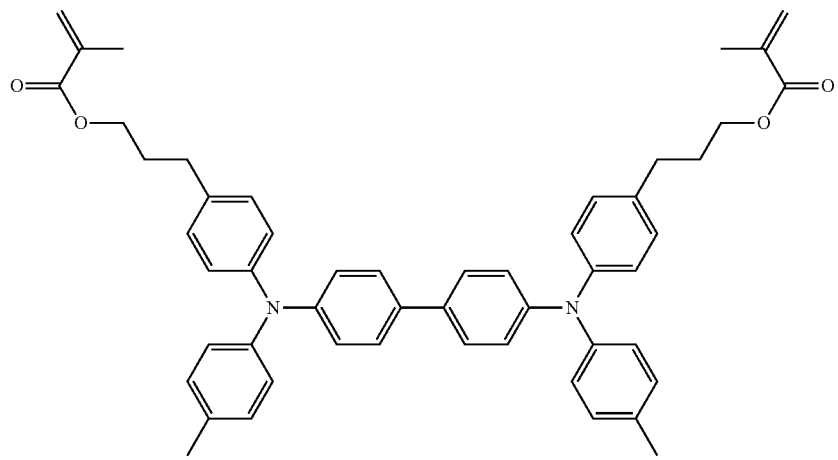
(Example compound 2-5)
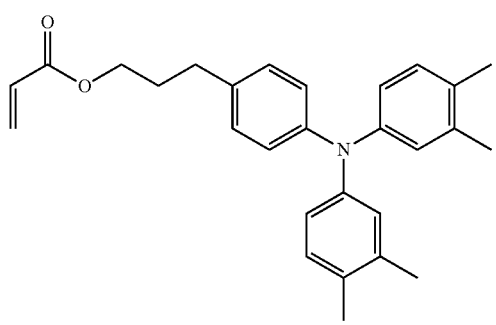
(Example compound 2-6)
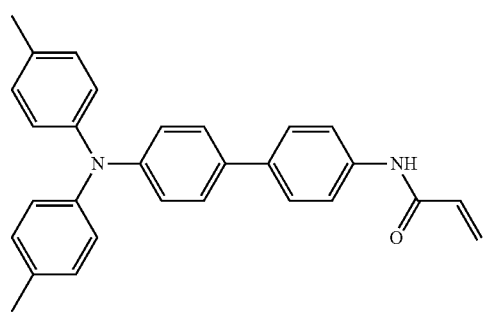

-continued (Example compound 2-7)

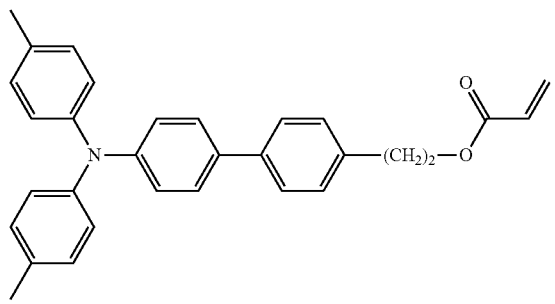

(Example compound 2-8)

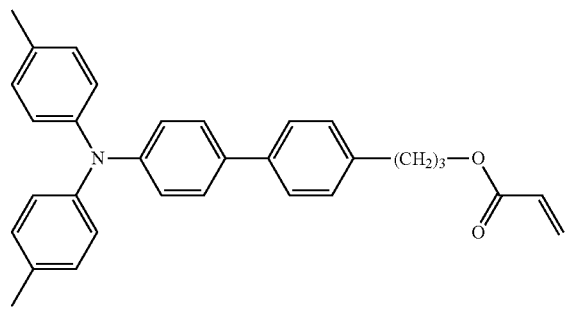

(Example compound 2-9)

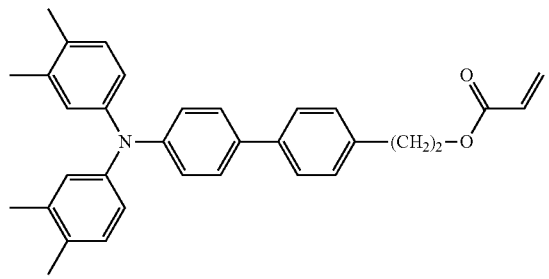

(Example compound 2-10)

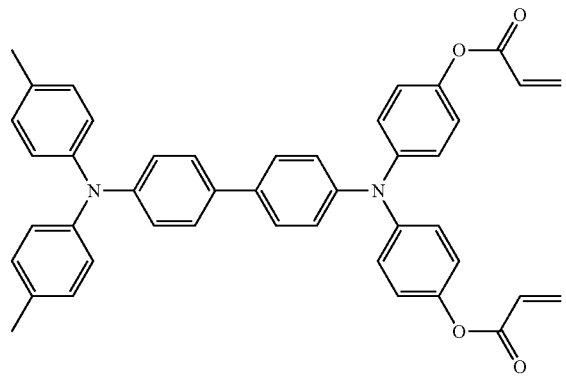

The average thickness of the second electrochromic layer is not particularly limited, may be appropriately selected depending on the intended purpose, and is preferably 0.1 micrometers or greater but 30 micrometers or less and more preferably 0.4 micrometers or greater but 10 micrometers or less.

Examples of the method for forming the second electrochromic layer when the second electrochromic layer is an inorganic compound include, but are not limited to, a sputtering method, a vapor deposition method, application of the material having a nanoparticle form, and electrolytic deposition. Examples of the method for forming an organic compound having a layer form include, but are not limited to, a method of forming a polymeric film, and a method of making a structure in which the organic compound is supported by conductive or semi-conductive particles. Specific examples of the method for forming a polymeric film include, but are not limited to, a method of dissolving a polymerized organic electrochromic compound in a solvent, applying the obtained solution on an electrode, and removing the solvent, and a method of applying an organic electrochromic compound into which a polymerizable functional group is introduced, on an electrode together with a polymerization initiator, and polymerizing the resultant.

Examples of the method for applying the materials on the electrode include, but are not limited to, a spin coating method, a casting method, a microgravure coating method, a gravure coating method, a bar coating method, a roll coating method, a wire bar coating method, a dip coating method, a slit coating method, a capillary coating method, a spray coating method, and a nozzle coating method, and various printing methods such as a gravure printing method, a screen printing method, a flexographic printing method, an offset printing method, a reverse printing method, and an inkjet printing method.

<Other Members>

The other members are not particularly limited and may be appropriately selected depending on the intended purpose. Examples of the other members include, but are not limited to, an insulating porous layer, a deterioration preventing layer, and a sealing material.

<<Insulating Porous Layer>>

The insulating porous layer has a function of separating the first electrode and the second electrode from each other for electrical insulation, and supporting an electrolyte.

The material of the insulating porous layer is not particularly limited so long as the material is porous. Organic materials and inorganic materials having a high insulating property, a high durability, and an excellent film formation property, and composite materials of these materials are preferable as the material of the insulating porous layer.

Examples of the material of the insulating porous layer include, but are not limited to, a polymer-mixed particle film containing metal oxide particles (e.g., $SiO_2$ particles and $Al_2O_3$ particles) and a polymer binding agent; a porous organic film (e.g., polyurethane resins and polyethylene resins); and an inorganic insulating material film formed into a porous film form. Among these materials, a polymer-mixed particle film containing $SiO_2$ particles and a polymer binding agent is preferable in terms of an excellent insulating property, a relatively low refractive index, and inexpensiveness of $SiO_2$ particles.

Examples of the method for forming the insulating porous layer include, but are not limited to, a sintering method (use of pores generated between polymeric particles or inorganic particles partially fused with each other by addition of, for example, a binder), an extraction method (forming a layer using, for example, an organic material or an inorganic material soluble in a solvent and a binder insoluble in a solvent, and subsequently dissolving the organic material or the inorganic material in a solvent to obtain pores), a foaming method, a phase inversion method of operating a good solvent and a poor solvent to induce phase separation in a mixture of polymeric components, a radiation irradiation method of radiating various radioactive rays to form pores, a vacuum vapor deposition method, a sputtering method, and an ion plating method.

When the material of the insulating porous layer is a material that can be applied and form the insulating porous layer, a spin coating method, a casting method, a microgravure coating method, a gravure coating method, a bar coating method, a roll coating method, a wire bar coating method, a dip coating method, a slit coating method, a capillary coating method, a spray coating method, and a nozzle coating method, and various printing methods such as a gravure printing method, a screen printing method, a flexographic printing method, an offset printing method, a reverse printing method, and an inkjet printing method can be used.

The average thickness of the insulating porous layer is not particularly limited, may be appropriately selected depending on the intended purpose, and is preferably 0.5 micrometers or greater but 3 micrometers or less.

<<Deterioration Preventing Layer>>

The deterioration preventing layer can be provided in a manner to contact an electrode on which no electrochromic layer is formed.

The deterioration preventing layer can undergo a reverse chemical reaction from the electrochromic layers formed of the electrochromic compositions to take an electric charge balance and suppress corrosion or deterioration of the first electrode and the second electrode due to irreversible oxidation reduction reactions. The reverse chemical reaction also includes the deterioration preventing layer's functioning as a capacitor, in addition to undergoing oxidation reduction.

The material of the deterioration preventing layer is not particularly limited and may be appropriately selected depending on the intended purpose so long as the material can serve the function of preventing corrosion of the first electrode and the second electrode due to irreversible oxidation reduction reactions. Examples of the material of the deterioration preventing layer include, but are not limited to, tin-antimony oxide, nickel oxide, titanium oxide, zinc oxide, and tin oxide, and conductive metal oxides or semi-conductive metal oxides containing a plurality of kinds of these materials.

The average thickness of the deterioration preventing layer is not particularly limited, may be appropriately selected depending on the intended purpose, and is preferably 0.1 micrometers or greater but 30 micrometers or less, and more preferably 0.4 micrometers or greater but 10 micrometers or less.

<<Sealing Material>>

It is preferable to provide an electrochromic element with a sealing material that seals the side surfaces of the layers pasted with each other. Providing a sealing material has, for example, an effect of preventing leakage of an electrolyte and an effect of preventing intrusion of unnecessary matters for the electrochromic display element to operate stably, such as moisture and oxygen in the air.

The sealing material is not particularly limited, and may be appropriately selected from ultraviolet-curable resins and thermosetting resins depending on the intended purpose. Examples of the sealing material include, but are not limited to, acrylic resins, urethane resins, and epoxy resins.

(Method for Producing Electrochromic Display Element)

A method for producing an electrochromic display element of the present disclosure is a method for producing the electrochromic display element of the present disclosure including a first substrate, a first electrode over the first substrate, a first electrochromic layer over the first electrode, an electrolyte layer over the first electrochromic layer, a second electrode over the electrolyte layer, and a second substrate over the second electrode, includes a first electrochromic layer washing step, preferably includes a tin oxide layer forming step and a first electrochromic layer forming step, and further includes other steps as needed.

<<Tin Oxide Layer Forming Step>>

The tin oxide layer forming step is a step of applying tin oxide on a first electrode formed on a first substrate, to form a tin oxide layer.

The method for forming the tin oxide layer is not particularly limited and may be appropriately selected depending on the intended purpose. Examples of the method include, but are not limited to, a spin coating method and a dip coating method.

<<First Electrochromic Layer Forming Step>>

The first electrochromic layer forming step is a step of adsorbing an electrochromic compound containing a functional group bindable to the tin oxide to the tin oxide layer, to form a first electrochromic layer.

The method for adsorbing the electrochromic compound to the tin oxide layer is not particularly limited and may be appropriately selected depending on the intended purpose. For example, it is possible to adsorb the electrochromic compound to the tin oxide layer by applying a solution obtained by dissolving the electrochromic compound in a solvent on the tin oxide layer. Examples of the applying method include, but are not limited to, a spin coating method, a casting method, a bar coating method, a roll coating method, a wire bar coating method, a dip coating method, a slit coating method, a capillary coating method, a spray coating method, a nozzle coating method, and an inkjet printing method.

The electrochromic compound may be heated after the electrochromic compound is applied on the tin oxide layer.

The heating temperature is preferably 50 degrees C. or higher but 150 degrees C. or lower, and more preferably 50 degrees C. or higher but 100 degrees C. or lower.

Heating can promote chemical binding between the bindable functional group of the electrochromic compound and the hydroxyl group on the surface of tin oxide, and immobilize the electrochromic compound to the tin oxide layer.

The heating time for heating the electrochromic compound applied on the tin oxide layer can be appropriately selected depending on the heating temperature. When the heating time is 30 seconds or longer but 6 hours or shorter, the chemical binding can be formed.

<First Electrochromic Layer Washing Step>

The first electrochromic layer washing step is a step of washing the tin oxide to which the electrochromic compound is adsorbed, to remove any electrochromic compound left unadsorbed to the tin oxide.

The washing method is not particularly limited, and a known washing treatment can be appropriately selected depending on the intended purpose. Examples of the washing method include, but are not limited to, a method of washing the tin oxide using the solvent of the electrochromic compound coating liquid.

By washing the first electrochromic layer of which electrochromic compound is adsorbed to the tin oxide layer, it is possible to remove any electrochromic compound that is left unbound with tin oxide from the tin oxide (or the first electrochromic layer or the tin oxide layer), and suitably produce the electrochromic display element in which the amount by mole of the electrochromic compound per area of the first electrochromic layer is from $2.0 \times 10^{-8}$ mol/cm$^2$ through $2.0 \times 10^{-7}$ mol/cm$^2$.

<Other Steps>

Examples of the other steps include, but are not limited to, a first electrode forming step, a second electrode forming step, an electrolyte layer forming step, a second electrochromic layer forming step, an insulating porous layer forming step, a deterioration preventing layer forming step, a pasting step, and a sealing step.

The drawing is a schematic diagram illustrating an example of the electrochromic display element of the present disclosure. The electrochromic display element 21 includes a first substrate 11, a second substrate 12, a first electrode 13, a second electrode 14, a first electrochromic layer 15, a second electrochromic layer 16, and an electrolyte layer 17.

As illustrated in the drawing, the electrochromic display element 21 includes the electrodes (the first electrode 13 and the second electrode 14) and the first electrochromic layer 15 between the facing two substrates (the first substrate 11 and the second substrate 12), and the electrolyte layer 17 is between the electrodes. The first electrochromic layer 15 contains tin oxide and an electrochromic compound supported by the tin oxide. The drawing illustrates an embodiment including the second electrochromic layer 16. Another embodiment may include a deterioration preventing layer instead of the second electrochromic layer. The electrochromic display element 21 may include other members as needed.

EXAMPLES

The present disclosure will be described below by way of Examples. The present disclosure should not be construed as being limited to these Examples.

Example 1

An electrochromic display element illustrated in the drawing was produced according to the procedure described below. Here, transparency of a tin oxide layer formed on an ITO-polycarbonate substrate was measured during the production process, and transparency of a completed transmission-type element was measured.

<Production of First Electrode>

An ITO film having a thickness of about 100 nm was formed all over a surface of a polycarbonate substrate (40 mm×40 mm) serving as a first substrate 11 by a sputtering method, to produce a first electrode 13. The surface resistance of the first electrode 13 was about 200Ω.

Using a coating liquid produced in the manner described below, a tin oxide layer was formed on the obtained first electrode 13. A tin oxide sol solution used was a transparent liquid and would not produce a precipitate at all when left to stand still.

[Production of Tin Oxide Layer Forming Coating Liquid]

A tin oxide sol solution (obtained from Nissan Chemical Corporation, CELNAX CX-S510M, with a tin oxide average primary particle diameter of from 3 nm through 8 nm, a catalog value) (5.50 g), ethyl cellulose (10 cp, 10% by mass, an ethanol solution) (1.00 g), tin(IV) tetra(t-butoxide) (0.50 g), and terpineol (9.05 g) were mixed and treated with an ultrasonic homogenizer for 2 minutes. Subsequently, a volatile component was removed from the resultant using an evaporator, to obtain a paste-state tin oxide layer forming coating liquid.

<Production of Tin Oxide Layer>

Using a screen printer, the tin oxide layer forming coating liquid was applied with an average thickness of 1 micrometer, dried with hot air (at 80 degrees C. for 5 minutes), and subsequently treated with UV/ozone (at 80 degrees C. for 30 minutes), to form a tin oxide layer (a supporting particle layer). In this state, i.e., the first substrate on which the tin oxide layer was formed was measured with a haze meter (obtained from Nippon Denshoku Industries Co., Ltd., NDH 7000). As a result, the haze was 0.80%.

<Production of First Electrochromic Layer>

A 2,2,3,3-tetrafluoro-1-propanol (TFP) solution containing 2% by mass of Example compound 1-1 presented below, which was a cathodic electrochromic compound, was spin-coated on the tin oxide layer formed, and annealed at 80 degrees C. for 10 minutes. Successively, the resultant was sufficiently washed with a TFP solvent, and annealed at 120 degrees C. for 10 minutes, to form a first electrochromic layer 15.

The haze measured here was 0.86%, meaning a significant transparency.

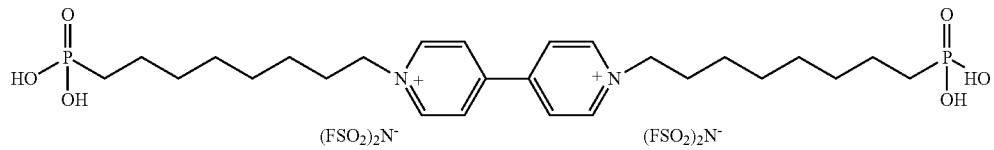

<Production of Second Electrochromic Layer>

An ITO film having a thickness of about 100 nm was formed all over a surface of a polycarbonate substrate (40 mm×40 mm) serving as a second substrate 12 by a sputtering method, to produce a second electrode 14. The surface resistance of the second electrode 14 was about 200Ω.

In order to form a second electrochromic layer 16 on the second electrode 14, a solution 1 having the composition described below was prepared.

[Solution 1]

| | |
|---|---|
| Example compound 2-1 presented below as an anodic electrochromic compound: | 50 parts by mass |
| PEG400DA (obtained from Nippon Kayaku Co., Ltd.) as an ionic conducting material: | 50 parts by mass |

-continued

[Solution 1]

| | |
|---|---|
| IRGACURE184 (obtained from BASF GmbH) as a polymerization initiator: | 5 parts by mass |
| Methyl ethyl ketone as a solvent: | 900 parts by mass |

(Example compound 2-1)

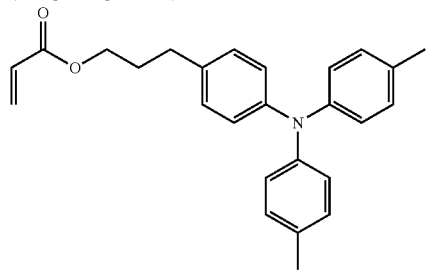 [SMILES: C=CC(=O)OCCCc1ccc(N(c2ccc(C)cc2)c2ccc(C)cc2)cc1]

Next, the obtained solution 1 was applied on the second electrode 14 by a spin coating method.

The obtained coating film was irradiated with 10 mW for 60 seconds using a UV irradiator (obtained from Ushio Inc., SPOT CURE), and annealed at 60 degrees C. for 10 minutes, to form a second electrochromic layer 16 having an average thickness of 1.3 micrometers.

<Production of Electrolyte Layer>

BLEMMER AME400 (obtained from NOF Corporation) (195 parts by mass), BLEMMER ADE400A (obtained from NOF Corporation) (195 parts by mass), IRGACURE 184 (obtained from BASF GmbH) serving as a polymerization initiator (10 parts by mass), ethyl methyl imidazolium bisfluorosulfonimide (product name: EMIMFSI, obtained from Kanto Chemical Co., Inc.) serving as an ionic liquid (600 parts by mass), and a compound 1 serving as an oxidizable substance (50 parts by mass) were mixed, to obtain a monomer composition liquid.

Next, the monomer composition liquid was weighed out by 30 mg using a micropipette, and dropped onto the second electrochromic layer, to obtain an electrolyte layer 17 formed of the monomer composition liquid.

<Production of Electrochromic Element>

The first substrate 11 including the first electrochromic layer 15, and the second substrate 12 including the second electrochromic layer 16 and the electrolyte layer 17 were pasted with each other in a manner that the first electrochromic layer 15 and the electrolyte layer 17 would contact each other, to obtain a pasted element.

The obtained pasted element was irradiated with UV (with a wavelength of 250 nm) at 10 mW for 60 seconds using a UV irradiator (obtained from Ushio Inc., SPOT CURE), to produce an electrochromic element of Example 1.

<Measurement of Average Thickness of First Electrochromic Layer>

After the first electrochromic layer of Example 1 was produced, steps were measured at arbitrary ten points using a stylus profilometer (ALPHASTEP IQ, obtained from Yamato Scientific Co., Ltd.), and the average of the measurements was calculated as an average step.

<Measurement of Amount of Electrochromic Compound Adsorbed>

By an electrochemical measurement using a half cell produced in the manner described below, the amount of the electrochromic compound adsorbed to the first electrochromic layer 15 was obtained as a mole number [mol/cm$^2$] of the electrochromic compound per area of the first electrochromic layer 15.

<<Production of Half Cell>>

An element was produced in the same manner as in the process of producing the electrochromic element described above except that no second electrochromic layer 16 was provided, to produce a half cell.

<<Electrochemical Measurement>>

Linear sweep voltammetry of the obtained half cell was performed using a potentio-galvanostat (obtained from BAS Inc., ALS660C). The sweep range was from 0 V through 2 V, and the sweep rate was 0.01 V/second. The voltammogram had a shape that appeared as if the baseline of the surface wave had risen. The baseline corresponds to the electrochemical reaction of tin oxide, and the surface wave corresponds to the electrochemical reaction of the electrochromic compound. Hence, the amount of charges by which the electrochromic compound had reacted was obtained by subtraction of the baseline from the total current. The amount of charges was converted to the number of molecules using the Faraday constant, to obtain the mole number [mol/cm$^2$] of the electrochromic compound per area of the first electrochromic layer 15.

<Evaluation>

The produced electrochromic display element of Example 1 was evaluated in the manners described below.

<<Transparency>>

The haze of the electrochromic display element of Example 1 measured at the time when the first electrochromic layer 15 was formed using a haze meter (obtained from Nippon Denshoku Industries Co., Ltd., NDH 7000) was 0.86% as described above, meaning a significant transparency.

<<Crack>>

The electrochromic display element of Example 1 was processed to be bent using a curved surface molding machine described in JP-2019-107888-A, and presence or absence of a crack in the first electrochromic layer 15 after bending-processing was observed and evaluated according to the evaluation criteria described below. The result is presented in Table 1.

[Evaluation Criteria]

A: No crack occurred at all.

B: A crack occurred.

<<Color Development Test>>

A predetermined voltage was applied to the electrochromic display element of Example 1 after bending-processing, to cause the electrochromic display element to develop colors. As a result, the first electrochromic layer 15 and the second electrochromic layer 16 developed colors, and a vivid display was obtained.

The result of the color development/decolorization test was evaluated according to the evaluation criteria described below. The result is presented in Table 1.

[Evaluation Criteria]

A: The first electrochromic layer 15 and the second electrochromic layer 16 both developed colors, and a vivid display was obtained.

B: A good display was not obtained because, for example, color development was weak, pale white cloudiness was mixed in the developed color, and a cracked region did not develop a color.

Example 2

An electrochromic display element of Example 2 was produced in the same manner as in Example 1 except that unlike in Example 1, Example compound 1-5 presented below was used as the electrochromic compound as presented in Table 1, and evaluated.

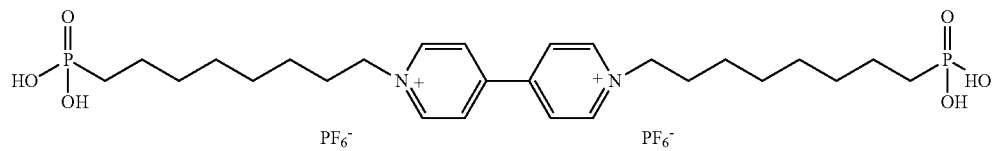

Example 3

An electrochromic display element of Example 3 was produced in the same manner as in Example 1 except that unlike in Example 1, Example compound 1-12 presented below was used as the cathodic electrochromic compound as presented in Table 1, and evaluated.

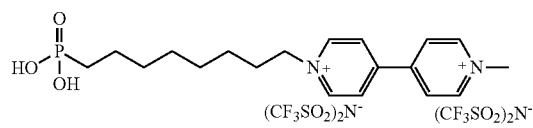

Examples 4 to 9

Electrochromic display elements of Examples 4 to 9 were produced in the same manner as in Example 1 except that unlike in Example 1, the average thickness of the first electrochromic layer was changed as presented in Table 1, and evaluated.

The electrochromic elements of Examples 2 to 9 were processed to be bent in the same manner as in Example 1. Whether a crack did not occur in the color developing layer after bending-processing was confirmed.

A predetermined voltage was applied to the electrochromic display elements of Examples 2 to 9 after bending-processing, to cause the electrochromic display elements to develop colors in the same manner as in Example 1. As a result, the first electrochromic layer 15 and the second electrochromic layer 16 developed colors, and a vivid display was obtained.

Comparative Example 1

An electrochromic display element of Comparative Example 1 was produced in the same manner as in Example 1 except that unlike in Example 1, a titanium oxide layer forming coating liquid described below containing titanium oxide particles having an average particle diameter of 21 nm (obtained from Nippon Aerosil Co., Ltd., P-25) was used instead of the tin oxide layer forming coating liquid, to form a titanium oxide layer instead of a tin oxide layer. The electrochromic display element was evaluated. The results are presented in Table 2.

[Production of Titanium Oxide Layer Forming Coating Liquid]

A prescription including titanium oxide (2.7 g), bis(2,4-pentanedionate) titanium(IV) oxide (0.5 g), and methanol (20 g) was subjected to dispersion treatment for 2 hours using zirconia beads and a paint shaker, to obtain a primary dispersion liquid. The primary dispersion liquid (22.2 g), ethyl cellulose (10% by mass, ethanol solution) (1.0 g), and terpineol (10 g) were mixed and treated for 2 minutes using an ultrasonic homogenizer. Subsequently, a volatile component was removed from the resultant using an evaporator, to obtain a paste-state titanium oxide layer forming coating liquid.

<Production of Titanium Oxide Layer>

Using a screen printer, the titanium oxide layer forming coating liquid was applied with an average thickness of 1 micrometer, dried with hot air (at 80 degrees C. for 5 minutes), and subsequently treated with UV/ozone (at 80 degrees C. for 30 minutes), to form a titanium oxide layer.

The haze measured at the time when the first electrochromic layer 15 was formed was 6.14%, and white cloudiness was observed.

The electrochromic element of Comparative Example 1 was processed to be bent. As a result, a crack occurred in the color developing layer after bending-processing.

The electrochromic display element of Comparative Example 1 was caused to develop colors in the same manner as in Example 1. As a result, the second electrochromic layer 16 developed a vivid color, whereas the first electrochromic layer 15 developed a color mixed with pale white cloudiness.

Comparative Example 2

An electrochromic display element of Comparative Example 2 was produced in the same manner as in Example 1 except that unlike in Example 1, the tin oxide layer forming coating liquid was changed to a tin oxide layer forming coating liquid 1 described below containing tin oxide particles having an average particle diameter of 30 nm (obtained from C.I. Kasei Co., Ltd., NANOTEC), to form a tin oxide layer. The electrochromic display element was evaluated. The results are presented in Table 2.

[Tin Oxide Layer Forming Coating Liquid 1]

A prescription including tin oxide (obtained from C.I. Kasei Co., Ltd., NANOTEC) (2.7 g), tin(IV) tetra(t-butoxide) (0.5 g), and methanol (20 g) was subjected to dispersion treatment for 2 hours using zirconia beads and a paint shaker, to obtain a primary dispersion liquid. The primary dispersion liquid was an opaque liquid and produced a precipitate when left to stand still for 2 hours. The primary dispersion liquid (22.2 g), ethyl cellulose (10% by mass, ethanol solution) (1.0 g), and terpineol (10 g) were mixed and treated for 2 minutes using an ultrasonic homogenizer. Subsequently, a volatile component was removed from the resultant using an evaporator, to obtain a paste-state tin oxide layer forming coating liquid 1.

The haze measured at the time when the first electrochromic layer 15 was formed was 2.76%, and white cloudiness was observed.

The electrochromic element of Comparative Example 2 was processed to be bent. As a result, a crack occurred in the color developing layer after bending-processing.

The electrochromic display element of Comparative Example 2 was caused to develop colors in the same manner as in Example 1. As a result, the second electrochromic layer 16 developed a vivid color, whereas the first electrochromic layer 15 developed a color mixed with pale white cloudiness.

Comparative Example 3

An electrochromic display element of Comparative Example 3 was produced in the same manner as in Example 1, except that unlike in Example 1, a first electrochromic layer 15 to which no electrochromic compound was adsorbed as presented in Table 2 was formed, and evaluated. The results are presented in Table 2.

The haze measured at the time when the first electrochromic layer 15 formed only of a tin oxide layer was formed was 0.76%, and no white cloudiness was observed and the element was transparent.

The electrochromic element of Comparative Example 3 was processed to be bent. As a result, it was confirmed that no crack occurred in the color developing layer after bending-processing.

A color developing voltage was applied to the electrochromic display element of Comparative Example 3 in the same manner as in Example 1. As a result, the second electrochromic layer 16 developed a color, whereas the first electrochromic layer 15 did not develop a color. Therefore, color development of the electrochromic display element was weak, and a good display was not obtained.

Comparative Example 4

An electrochromic display element of Comparative Example 4 was produced in the same manner as in Example 1 except that unlike in Example 1, a first electrochromic layer 15 was formed without washing with a solvent after an electrochromic compound was applied on a tin oxide layer. The electrochromic display element was evaluated. The results are presented in Table 2.

The electrochromic element of Comparative Example 4 was processed to be bent. As a result, a crack occurred in the color developing layer after bending-processing.

A predetermined voltage was applied to the electrochromic display element of Comparative Example 4 after bending-processing, to cause the electrochromic display element to develop colors. As a result, the cracked region did not develop a color, and a good color development was not obtained.

Comparative Example 5

An electrochromic display element of Comparative Example 5 was produced in the same manner as in Example 1 except that unlike in Example 1, the average thickness of the first electrochromic layer was changed to 0.5 micrometers as presented in Table 2, and evaluated. The results are presented in Table 2.

The electrochromic element of Comparative Example 5 was processed to be bent. As a result, a crack occurred in the color developing layer after bending-processing.

A predetermined voltage was applied to the electrochromic display element of Comparative Example 5 after bending-processing, to cause the electrochromic display element to develop colors. As a result, the element did not develop sufficiently dense colors.

As obvious from the above results, it was revealed that when titanium oxide was used as supporting particles, and when tin oxide was used but had a large particle diameter, the element had a high haze and a poor transparency. It was revealed that when the amount of the cathodic electrochromic compound adsorbed to tin oxide was from $2.0 \times 10^{-8}$ mol/cm$^2$ through $2.0 \times 10^{-7}$ mol/cm$^2$, no crack occurred in the color developing layer when the electrochromic display element was processed to be bent, and the electrochromic display element was able to maintain a good appearance. It was also revealed that when the amount of the electrochromic compound adsorbed was less than $2.0 \times 10^{-8}$ mol/cm$^2$, the electrochromic element was not able to develop a sufficiently dense color and a good color development was not obtained.

TABLE 1

| | Supporting particles | | Average thickness of first electrochromic layer [micrometer] | Electrochromic compound | | Evaluation | | |
|---|---|---|---|---|---|---|---|---|
| | Kind | Particle diameter [nm] | | Kind | Amount of adsorption ×10$^{-8}$ [mol/cm$^2$] | Haze (%) | Transparency | Crack | Color development |
| Ex. 1 | SnO$_2$ | 3-8 | 2.5 | Example compound 1-1 | 10.9 | 0.86 | A | A | A |
| Ex. 2 | SnO$_2$ | 3-8 | 2.5 | Example compound 1-5 | 9.0 | 0.90 | A | A | A |

TABLE 1-continued

| | Supporting particles | | | Electrochromic compound | | Evaluation | | |
|---|---|---|---|---|---|---|---|---|
| | Kind | Particle diameter [nm] | Average thickness of first electro- chromic layer [micrometer] | Kind | Amount of adsorption ×10⁻⁸ [mol/cm²] | Haze (%) | Transparency | Crack | Color development |
| Ex. 3 | $SnO_2$ | 3-8 | 2.5 | Example compound 1-12 | 10.5 | 0.80 | A | A | A |
| Ex. 4 | $SnO_2$ | 3-8 | 2.0 | Example compound 1-1 | 6.8 | 0.85 | A | A | A |
| Ex. 5 | $SnO_2$ | 3-8 | 1.5 | Example compound 1-1 | 3.4 | 0.82 | A | A | A |
| Ex. 6 | $SnO_2$ | 3-8 | 1.0 | Example compound 1-1 | 2.2 | 0.89 | A | A | A |
| Ex. 7 | $SnO_2$ | 3-8 | 3.0 | Example compound 1-1 | 11.7 | 0.80 | A | A | A |
| Ex. 8 | $SnO_2$ | 3-8 | 3.5 | Example compound 1-1 | 12.1 | 0.81 | A | A | A |
| Ex. 9 | $SnO_2$ | 3-8 | 4.0 | Example compound 1-1 | 19.8 | 0.86 | A | A | A |

TABLE 2

| | Supporting particles | | | Electrochromic compound | | Evaluation | | |
|---|---|---|---|---|---|---|---|---|
| | Kind | Particle diameter [nm] | Average thickness of first electro- chromic layer [micrometer] | Kind | Amount of adsorption ×10⁻⁸ [mol/cm²] | Haze (%) | Transparency | Crack | Color development |
| Comp. Ex. 1 | $TiO_2$ | 21.0 | 2.5 | Example compound 1-1 | 7.5 | 6.14 | B | B | B |
| Comp. Ex. 2 | $SnO_2$ | 30.0 | 2.5 | Example compound 1-1 | 12.0 | 2.76 | B | B | B |
| Comp. Ex. 3 | $SnO_2$ | 3-8 | 2.5 | Example compound 1-1 | 0.0 | 0.76 | A | A | B |
| Comp. Ex. 4 | $SnO_2$ | 3-8 | 2.5 | Example compound 1-1 | 23.0 | 0.83 | A | B | B |
| Comp. Ex. 5 | $SnO_2$ | 3-8 | 0.5 | Example compound 1-1 | 1.6 | 0.82 | A | A | B |

Aspects and embodiments of the present disclosure are, for example, as follows.

<1> An electrochromic display element including:
a first substrate,
a first electrode over the first substrate:
a first electrochromic layer over the first electrode;
an electrolyte layer over the first electrochromic layer;
a second electrode over the electrolyte layer; and
a second substrate over the second electrode.
wherein the first electrochromic layer contains tin oxide having an average primary particle diameter of less than 30 nm and an electrochromic compound containing a functional group bindable to the tin oxide, and
an amount by mole of the electrochromic compound per area of the first electrochromic layer is from $2.0 \times 10^{-8}$ mol/cm² through $2.0 \times 10^{-7}$ mol/cm².
<2> The electrochromic display element according to <1>,
wherein the average primary particle diameter of the tin oxide is 3 nm or greater but 8 nm or less.
<3> The electrochromic display element according to <1> or <2>,
wherein the electrochromic compound is represented by General formula (1) below, General formula (1)

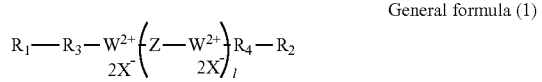

where in General formula (1), $R_1$ and $R_2$ each independently represent a hydrogen atom, an aryl group that contains from 6 through 14 carbon atoms and may contain a substituent, a heteroaryl group that contains from 3 through 14 carbon atoms and may contain a substituent, a branched alkyl group that contains from 3 through 10 carbon atoms, an alkenyl group that contains from 2 through 10 carbon atoms and may contain a substituent, a cycloalkyl group that contains from 6 through 10 carbon atoms and may contain a substituent, or the functional group bindable to the tin oxide, $R_1$ or $R_2$, or both are the functional group bindable to the tin oxide; $R_3$ and $R_4$ each independently represent an alkylene group that contains from 1 through 10 carbon atoms and may contain a substituent or an arylene group that contains from 6 through 12 carbon atoms and may contain a substituent; $W^{2+}$ represents a dication represented by General formula (2) below; Z represents an alkylene group that contains from 1 through 12 carbon atoms and may contain a substituent, a cycloalkylene group that contains from 3 through 7 carbon atoms and may contain a substituent, or a divalent group represented by General formula (3) below; "l" represents 0 or 1; and X− represents a monovalent anion,

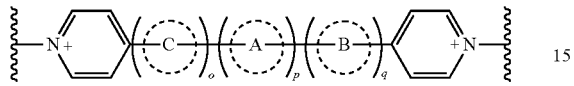

General formula (2)

where in General formula (2), "o", "p", and "q" each independently represent 0 or 1, A, B, and C each independently represent an arylene group that contains from 2 through 20 carbon atoms and may contain a substituent, or a heterocyclic group that contains from 2 through 20 carbon atoms and may contain a substituent, $$-R_5-Y-R_6-$$  General formula (3)

where in General formula (3), $R_5$ and $R_6$ each independently represent a single bond, alkylene, or cycloalkylene; Y represents arylene, cycloalkylene, heteroarylene, arylene-arylene, or arylene-CR'R"-arylene; and R' and R" form a carbocyclic group together with carbon with which R' and R" bind.

<4> The electrochromic display element according to <3>, wherein X− in General formula (1) is a monovalent anion having an oxidation potential higher by 3.1 V or more than a reduction potential of the dication $W^{2+}$ in General formula (1).

<5> The electrochromic display element according to <4>, wherein X− is a monovalent anion selected from the group consisting of $(FSO_2)_2N^-$, $(CF_3SO_2)_2N^-$, $(CN)_4B^-$, $BF_4^-$, $PF_6^-$, and $ClO_4^-$.

<6> The electrochromic display element according to any one of <1> to <5>, wherein an average thickness of the first electrochromic layer is from 1.0 micrometer through 4.0 micrometers.

<7> The electrochromic display element according to any one of <1> to <6>, further including a second electrochromic layer on a surface of the second electrode facing the first electrode, the second electrochromic layer containing an anodic electrochromic compound.

<8> The electrochromic display element according to <7>, wherein the anodic electrochromic compound is a compound having a triarylamine structure.

<9> The electrochromic display element according to <8>, wherein the compound having the triarylamine structure is a compound represented by General formula (4) below, $$A_n\text{-}B_m$$  General formula (4)

wherein in General formula (4), "m" is 0 when "n" is 2, "m" is 0 or 1 when "n" is 1. A is represented by General formula (5) below and binds with B at any position selected from $R_1$ through $R_{15}$, and B is represented by General formula (6) below and binds with A at any position selected from $R_{16}$ through $R_{21}$,

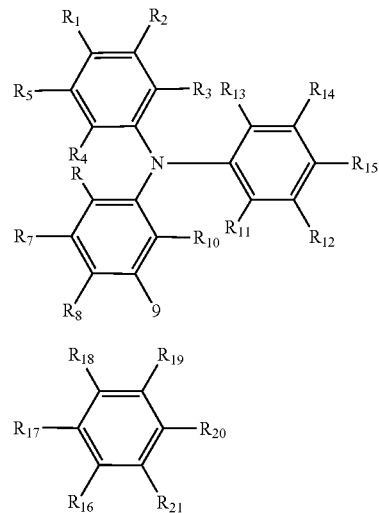

where in General formula (5) and General formula (6), at least one selected from $R_1$ through $R_{21}$ is a functional group bindable with a hydroxyl group, or a polymerizable functional group, and the rest of $R_1$ through $R_{21}$ are each independently a monovalent organic group that may contain a substituent.

<10> The electrochromic display element according to any one of <1> to <9>, wherein the functional group bindable to the tin oxide is one or more selected from the group consisting of a phosphonic acid group, a phosphoric acid group, a silyl group, and a carboxyl group.

<11> A method for producing the electrochromic display element according to any one of <1> to <10>, the method including
washing the tin oxide to which the electrochromic compound is adsorbed, to remove any electrochromic compound that is left unbound with the tin oxide.

<12> The method for producing the electrochromic display element according to <11>, further including
applying the tin oxide on the first electrode formed on the first substrate, to form a tin oxide layer.

<13> The method for producing the electrochromic display element according to <11> or <12>, further including
adsorbing the electrochromic compound containing the functional group bindable to the tin oxide to the tin oxide layer, to form the first electrochromic layer.

The electrochromic display element according to any one of <1> to <10> can solve the various problems in the related art and achieve the object of the present disclosure.

The method for producing the electrochromic display element according to any one of <11> to <13> aims for solving the various problems in the related art and achieving an object described below. That is, the method for producing the electrochromic display element has an object to provide a method for producing an electrochromic display element, capable of producing an electrochromic display element that has an excellent transparency, is suppressed from cracking of a color developing layer thereof, and has a good appearance and a good operability.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An electrochromic display element comprising:
a first substrate;
a first electrode over the first substrate;
a first electrochromic layer over the first electrode;
an electrolyte layer over the first electrochromic layer;
a second electrode over the electrolyte layer; and
a second substrate over the second electrode,
wherein the first electrochromic layer contains tin oxide having an average primary particle diameter of 3 nm or greater but 8 nm or less and an electrochromic compound containing a functional group bindable to the tin oxide,
wherein the first electrochromic layer does not contain titanium oxide, and
an amount by mole of the electrochromic compound per area of the first electrochromic layer is from $2.0 \times 10^{-8}$ mol/cm$^2$ through $2.0 \times 10^{-7}$ mol/cm$^2$.

2. The electrochromic display element according to claim 1,
wherein the electrochromic compound is represented by General formula (1) below,

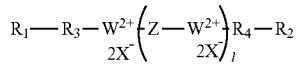

General formula (1)

where in General formula (1), $R_1$ and $R_2$ each independently represent a hydrogen atom, an aryl group that contains from 6 through 14 carbon atoms and may contain a substituent, a heteroaryl group that contains from 3 through 14 carbon atoms and may contain a substituent, a branched alkyl group that contains from 3 through 10 carbon atoms, an alkenyl group that contains from 2 through 10 carbon atoms and may contain a substituent, a cycloalkyl group that contains from 6 through 10 carbon atoms and may contain a substituent, or the functional group bindable to the tin oxide, $R_1$ or $R_2$, or both are the functional group bindable to the tin oxide; $R_3$ and $R_4$ each independently represent an alkylene group that contains from 1 through 10 carbon atoms and may contain a substituent or an arylene group that contains from 6 through 12 carbon atoms and may contain a substituent; $W^{2+}$ represents a dication represented by General formula (2) below; Z represents an alkylene group that contains from 1 through 12 carbon atoms and may contain a substituent, a cycloalkylene group that contains from 3 through 7 carbon atoms and may contain a substituent, or a divalent group represented by General formula (3) below; "l" represents 0 or 1; and $X^-$ represents a monovalent anion,

General formula (2)

where in General formula (2), "o", "p", and "q" each independently represent 0 or 1, A, B, and C each independently represent an arylene group that contains from 2 through 20 carbon atoms and may contain a substituent, or a heterocyclic group that contains from 2 through 20 carbon atoms and may contain a substituent, $$-R_5-Y-R_6-$$

General formula (3)

where in General formula (3), $R_5$ and $R_6$ each independently represent a single bond, alkylene, or cycloalkylene; Y represents arylene, cycloalkylene, heteroarylene, arylene-arylene, or arylene-CR'R''-arylene; and R' and R'' form a carbocyclic group together with carbon with which R' and R'' bind.

3. The electrochromic display element according to claim 2,
wherein $X^-$ in General formula (1) is a monovalent anion having an oxidation potential higher by 3.1 V or more than a reduction potential of the dication $W^{2+}$ in General formula (1).

4. The electrochromic display element according to claim 1,
wherein an average thickness of the first electrochromic layer is from 1.0 micrometer through 4.0 micrometers.

5. The electrochromic display element according to claim 1, further comprising
a second electrochromic layer on a surface of the second electrode facing the first electrode, the second electrochromic layer containing an anodic electrochromic compound.

6. The electrochromic display element according to claim 5,
wherein the anodic electrochromic compound is a compound having a triarylamine structure.

7. A method for producing the electrochromic display element according to claim 1, the method comprising
washing the tin oxide to which the electrochromic compound is adsorbed, to remove any electrochromic compound that is left unadsorbed to the tin oxide.

* * * * *